United States Patent
Damnjanovic et al.

(10) Patent No.: US 11,997,552 B2
(45) Date of Patent: May 28, 2024

(54) LAYER 1 (L1) AND LAYER 2 (L2) BASED MOBILITY PROCEDURES

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Juan Montojo, San Diego, CA (US); Ozcan Ozturk, San Diego, CA (US); Iyab Issam Sakhnini, San Diego, CA (US); Olufunmilola Omolade Awoniyi-Oteri, San Diego, CA (US); Sony Akkarakaran, Poway, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/339,668

(22) Filed: Jun. 4, 2021

(65) Prior Publication Data

US 2021/0385708 A1    Dec. 9, 2021

Related U.S. Application Data

(60) Provisional application No. 63/036,279, filed on Jun. 8, 2020, provisional application No. 63/036,093, filed (Continued)

(51) Int. Cl.
*H04W 36/00* (2009.01)
*H04W 8/02* (2009.01)
(Continued)

(52) U.S. Cl.
CPC ........ *H04W 36/0085* (2018.08); *H04W 8/02* (2013.01); *H04W 24/10* (2013.01);
(Continued)

(58) Field of Classification Search
CPC ............. H04W 24/10; H04W 36/0058; H04W 36/0085; H04W 36/08; H04W 72/21;
(Continued)

(56) References Cited

U.S. PATENT DOCUMENTS

2015/0304875 A1* 10/2015 Axmon ................. H04L 5/0098
370/328
2019/0387561 A1   12/2019 Paladugu et al.
(Continued)

OTHER PUBLICATIONS

ASUSTEK: "Discussion on Multi-Beam Operation", 3GPP Draft, R1-2101023, 3GPP TSG RAN WG1 #104-e, 3rd Generation Partnership Project (3GPP), Mobile Competence Centre, 650, Route Des Lucioles, F-06921 Sophia- Antipolis Cedex, France, vol. RAN WG1, No. e-Meeting, Jan. 25, 2021-Feb. 5, 2021, Jan. 15, 2021 (Jan. 15, 2021), XP051973294, 3 Pages, Retrieved from the Internet: URL:https://ftp.3gpp.org/tsg_ran/WG1_RL1/TSGR1_104-e/Docs/ R1-2101023.zip R1-2101023 Discussion on multi-beam operation.doc [retrieved on Jan. 15, 2021] chapter 2.
(Continued)

*Primary Examiner* — Nam T Huynh
(74) *Attorney, Agent, or Firm* — Patterson & Sheridan LLP

(57) ABSTRACT

Aspects of the present disclosure relate to wireless communications, and more particularly, to mobility techniques that allow for mobility of a user equipment (UE) between a set of cells. A method that may be performed by a UE includes receiving signaling configuring the UE with a set of cells that support physical (PHY) layer or medium access control (MAC) layer mobility signaling and with a measurement configuration for the set of cells, reporting, to a network
(Continued)

entity, measurements for at least some of the set of cells in accordance with the measurement configuration, and receiving, from the network entity, PHY layer or MAC layer mobility signaling to move the UE to one of the cells in the set, wherein the mobility signaling is based, at least in part, on the reported measurements.

30 Claims, 17 Drawing Sheets

Related U.S. Application Data on Jun. 8, 2020, provisional application No. 63/035,334, filed on Jun. 5, 2020.

(51) Int. Cl.
*H04W 24/10* (2009.01)
*H04W 48/20* (2009.01)

(52) U.S. Cl.
CPC . *H04W 36/0058* (2018.08); *H04W 36/00835* (2018.08); *H04W 48/20* (2013.01)

(58) Field of Classification Search
CPC ......... H04W 36/0055; H04W 36/0061; H04W 36/30; H04W 72/23; H04W 72/542; H04W 76/27; H04W 88/085; H04W 36/00835; H04W 36/0083; H04W 72/232; H04W 72/231
See application file for complete search history.

(56) References Cited

U.S. PATENT DOCUMENTS

| 2020/0169904 A1* | 5/2020 | Müller | H04W 36/00835 |
| 2022/0377622 A1* | 11/2022 | Zhang | H04W 36/0011 |

OTHER PUBLICATIONS

Huawei, et al., "Handover-Like Mechanism for L1/L2-Centric Inter-Cell Mobility", 3GPP Draft, R2-2105992, 3GPP TSG-RAN WG2 Meeting #114-e, 3rd Generation Partnership Project (3GPP), Mobile Competence Centre, 650, Route Des Lucioles, F-06921 Sophia-Antipolis Cedex, France, vol. RAN WG2, no. Electronic, May 19, 2021-May 27, 2021, May 10, 2021 (May 10, 2021), XP052004019, 4 Pages, Retrieved from the Internet: URL:https://ftp.3gpp.org/tsg_ran/WG2_RL2/TSGR2_114-e/Docs/R2-2105992.zip, R2-2105992.docx [retrieved on May 10, 2021] Title chapter 2.1 chapter 2.2.
International Search Report and Written Opinion—PCT/US2021/036047—ISA/EPO—dated Oct. 1, 2021.
NTT DOCOMO: "Overview of Mobility Enhancement for Small Cell Enhancement", 3GPP Draft, R1-130405, 3GPP TSG RAN WG1 Meeting #72, 3rd Generation Partnership Project (3GPP), Mobile Competence Centre, 650, Route Des Lucioles, F-06921 Sophia-Antipolis Cedex, France, vol. RAN WG1, no. St Julian, Jan. 28, 2013-Feb. 1, 2013, Jan. 19, 2013 (Jan. 19, 2013), XP050663689, pp. 1-8, Retrieved from the Internet: URL:http://www.3gpp.org/ftp/tsg_ran/WG1_RL1/TSGR1_72/Docs/ [retrieved on Jan. 19, 2013] Chapter 4, figure 5.
Qualcomm CDMA Technologies: "Discussion on Incoming RAN1 Ls for L1/L2 Inter-Cell Mobility and Draft LS Out", 3GPP Draft, R4-2107364, 3GPP TSG RAN WG4 Meeting #98-bis-e, 3rd Generation Partnership Project (3GPP), Mobile Competence Centre, 650, Route Des Lucioles, F-06921 Sophia-Antipolis Cedex, France, vol. RAN WG4, no. Electronic Meeting, Apr. 12, 2021-Apr. 20, 2021, Apr. 2, 2021 (Apr. 2, 2021), XP051992577, 5 Pages.

\* cited by examiner

As the UE Moves, it Autonomously Activates Cell5

LAYER 1 (L1) AND LAYER 2 (L2) BASED MOBILITY PROCEDURES

CROSS-REFERENCE TO RELATED APPLICATION(S)

This application claims benefit of and priority to U.S. Provisional Application No. 63/036,093 filed Jun. 8, 2020, U.S. Provisional Application No. 63/036,279 filed Jun. 8, 2020, and U.S. Provisional Application No. 63/035,334 filed Jun. 5, 2020 which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to mobility techniques that allow for dynamically signaling mobility of a user equipment (UE) between a set of cells and dynamically updating a set of cells and beams activated to serve the UE.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved mobility procedures.

Certain aspects provide a method for wireless communication by a user equipment (UE). The method generally includes receiving signaling configuring the UE with a set of cells that support physical (PHY) layer or medium access control (MAC) layer mobility signaling and with a measurement configuration for the set of cells, reporting, to a network entity, measurements for at least some of the set of cells in accordance with the measurement configuration, and receiving, from the network entity, PHY layer or MAC layer mobility signaling to move the UE to one of the cells in the set, wherein the mobility signaling is based, at least in part, on the reported measurements.

Certain aspects provide a method for wireless communication by a network entity. The method generally includes transmitting signaling configuring a UE with a set of cells that support PHY layer MAC layer mobility signaling and with a measurement configuration for the set of cells, receiving, from the UE, a reporting of measurements for at least some of the set of cells in accordance with the measurement configuration, and transmitting, to the UE, PHY layer or MAC layer mobility signaling to move the UE to one of the cells in the set, wherein the mobility signaling is based, at least in part, on the reported measurements.

Certain aspects can be implemented in an apparatus for wireless communication by a UE. The apparatus may include at least one processor and a memory coupled to the at least one processor, the memory including instructions executable by the at least one processor to cause the apparatus to receive signaling configuring the UE with a set of cells that support PHY layer or MAC layer mobility signaling and with a measurement configuration for the set of cells, reporting, to a network entity, measurements for at least some of the set of cells in accordance with the measurement configuration, and receiving, from the network entity, PHY layer or MAC layer mobility signaling to move the UE to one of the cells in the set, wherein the mobility signaling is based, at least in part, on the reported measurements.

Certain aspects can be implemented in an apparatus for wireless communication by a network entity. The apparatus may include at least one processor and a memory coupled to the at least one processor, the memory including instructions executable by the at least one processor to cause the apparatus to transmit signaling configuring a UE with a set of cells that support PHY layer MAC layer mobility signaling and with a measurement configuration for the set of cells, receive, from the UE, a reporting of measurements for at least some of the set of cells in accordance with the measurement configuration, and transmit, to the UE, PHY layer or MAC layer mobility signaling to move the UE to one of the cells in the set, wherein the mobility signaling is based, at least in part, on the reported measurements Certain aspects can be implemented in an apparatus for wireless communication by a UE. The apparatus may include means for receiving signaling configuring the UE with a set of cells that support PHY layer or MAC layer mobility signaling and with a measurement configuration for the set of cells, means for reporting, to a network entity, measurements for at least some of the set of cells in accordance with the measurement configuration, and means for receiving, from the network entity, PHY layer or MAC layer mobility signaling to move the UE to one of the cells in the set, wherein the mobility signaling is based, at least in part, on the reported measurements.

Certain aspects can be implemented in an apparatus for wireless communication by a network entity. The apparatus may include means for transmitting signaling configuring a UE with a set of cells that support PHY layer MAC layer mobility signaling and with a measurement configuration for the set of cells, means for receiving, from the UE, a reporting of measurements for at least some of the set of cells in accordance with the measurement configuration, and means for transmitting, to the UE, PHY layer or MAC layer mobility signaling to move the UE to one of the cells in the set, wherein the mobility signaling is based, at least in part, on the reported measurements.

Certain aspects can be implemented in a non-transitory computer-readable medium for wireless communication by a UE. The non-transitory computer-readable medium may comprise computer-executable instructions that, when executed by one or more processors of a processing system, cause the processing system to receive signaling configuring the UE with a set of cells that support PHY layer or MAC layer mobility signaling and with a measurement configuration for the set of cells, reporting, to a network entity, measurements for at least some of the set of cells in accordance with the measurement configuration, and receiving, from the network entity, PHY layer or MAC layer mobility signaling to move the UE to one of the cells in the set, wherein the mobility signaling is based, at least in part, on the reported measurements.

Certain aspects can be implemented in a non-transitory computer-readable medium for wireless communication by a UE. The non-transitory computer-readable medium may comprise computer-executable instructions that, when executed by one or more processors of a processing system, cause the processing system to transmit signaling configuring a UE with a set of cells that support PHY layer MAC layer mobility signaling and with a measurement configuration for the set of cells, receive, from the UE, a reporting of measurements for at least some of the set of cells in accordance with the measurement configuration, and transmit, to the UE, PHY layer or MAC layer mobility signaling to move the UE to one of the cells in the set, wherein the mobility signaling is based, at least in part, on the reported measurements.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for dynamically signaling mobility of a user equipment (UE) between a set of cells. As will be described in greater detail below, the UE may be configured with a set sells that support mobility based on Layer 1 (L1) (e.g., physical (PHY) layer) or Layer 2 (L2) (e.g., medium access control (MAC) layer) signaling.

Aspects of the present disclosure may provide for seamless mobility within the activated cells in the activated cell set. In some cases, the signaling mechanism may be relatively similar to beam management. For example, mobility management within the activated set may be performed through L1/L2 signaling used to activate/deactivate cells in the activated and deactivated cell sets to select beams within the activated cells.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communications System

Figure 1:
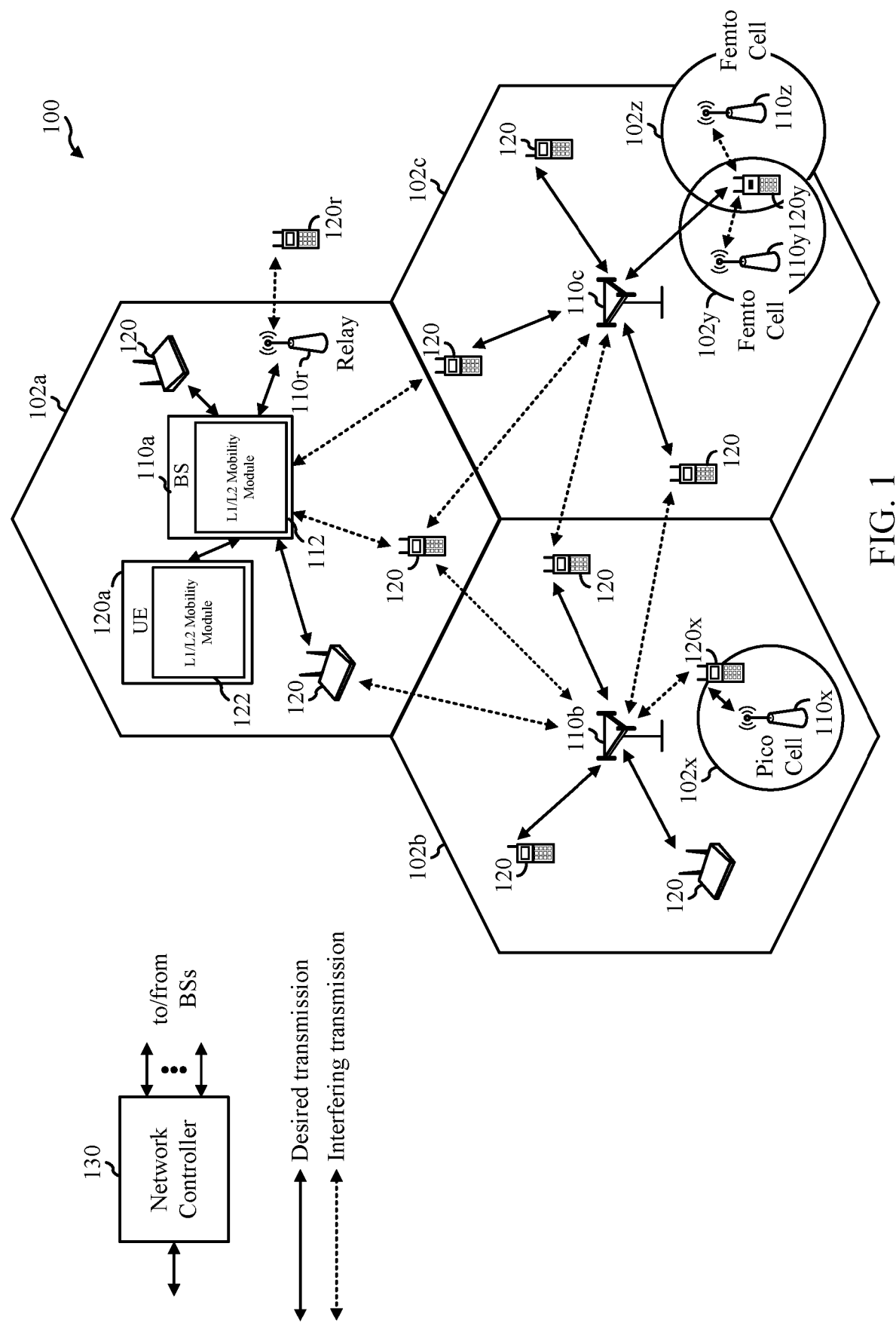
FIG. 1 shows an example wireless communication network in which aspects of the present disclosure may be performed.

FIG. 1 illustrates an example wireless communication network 100 in which aspects of the present disclosure may be performed. As shown in FIG. 1, the wireless communication network 100 may include a UE 120a configured to perform operations 700 of FIG. 7. Similarly, the wireless communication network 100 may include a base station (BS) 110 configured to perform operations 800 of FIG. 8 to assist a UE 120a performing operations 700 of FIG. 7. For example, the UE 120a includes a Layer 1 (L1)/Layer 2 (L2) Mobility Module 122 and the BS 110a includes an L1/L2 Mobility Module 112. The L1/L2 Mobility Module 122 and the L1/L2 Mobility Module 112 may be configured to perform mobility procedures, in accordance with certain aspects of the present disclosure.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of BSs 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio (NR) BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
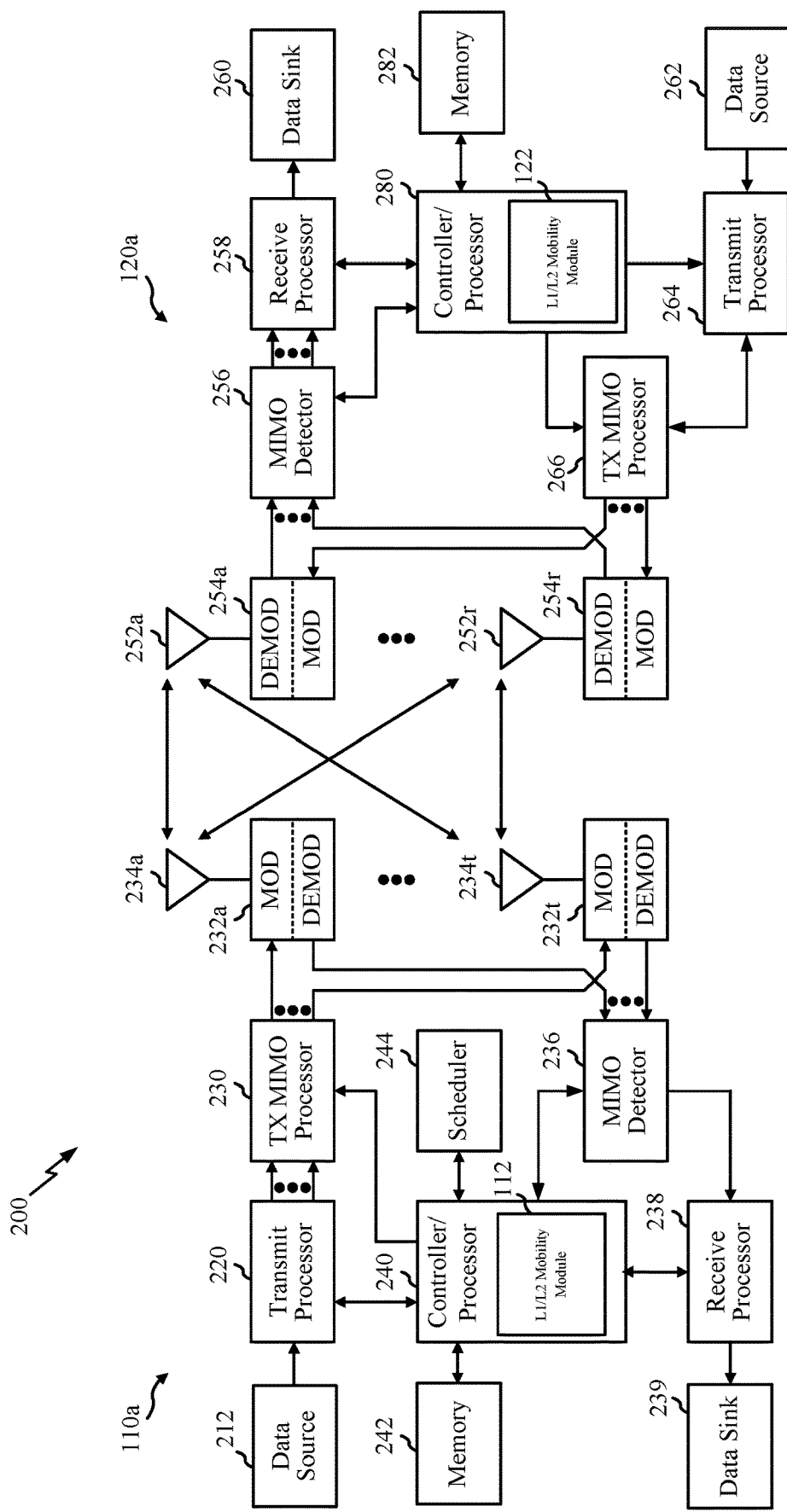
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communications network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110 and may provide received signals to the demodulators (DEMODs) in transceivers 254a-254r, respectively. Each demodulator may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL or UL.

The controller/processor 280 or other processors and modules at the UE 120a may perform or direct the execution of processes for the techniques described herein. As shown in FIG. 2, the controller/processor 280 of the UE 120a has an L1/L2 Mobility Module 122 that may be configured to perform (or cause UE 120a to perform) operations 700 of FIG. 7. Similarly, the BS 110a may include an L1/L2 Mobility Module 112 that may be configured to perform (or cause BS 110a to perform) operations 800 of FIG. 8.

Figure 3A:
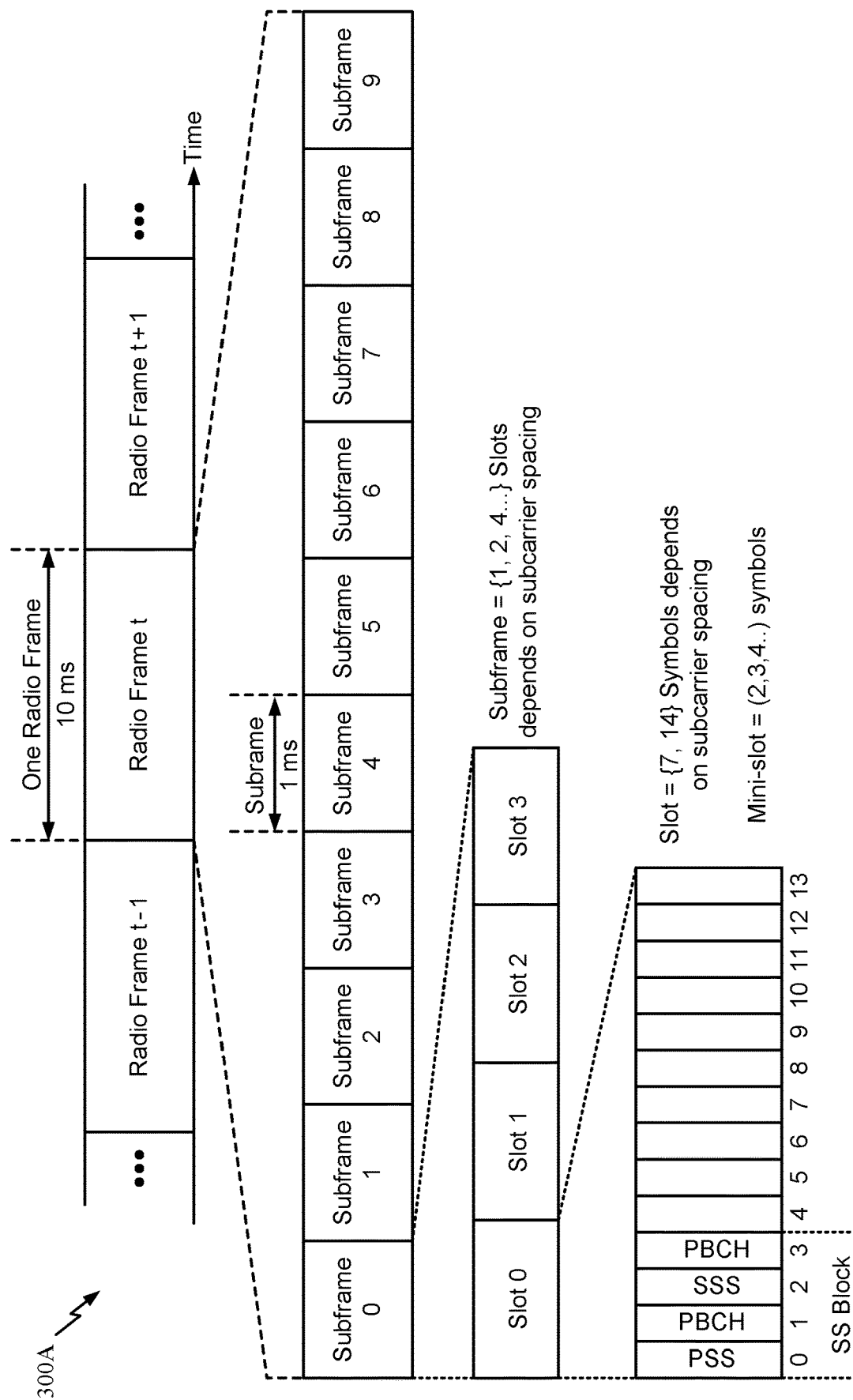
FIG. 3A illustrates an example of a frame format for a telecommunication system, in accordance with certain aspects of the present disclosure.

FIG. 3A is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmW. The up to sixty-four transmissions of the SSB are referred to as the synchronization signal (SS) burst set. SSBs in an SS burst set are transmitted in the same frequency region, while SSBs in different SS bursts sets can be transmitted at different frequency locations.

Figure 3B:
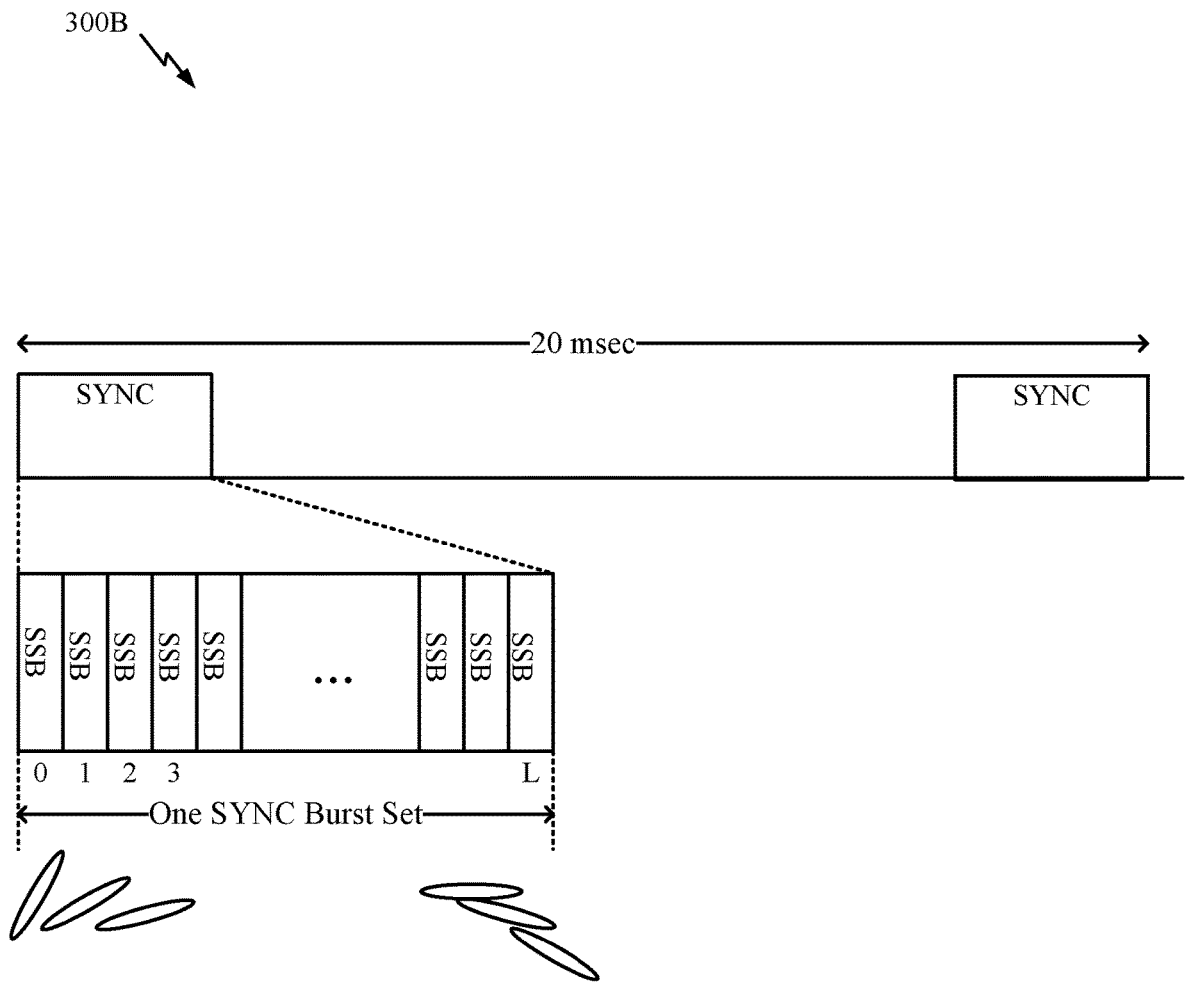
FIG. 3B illustrates how different synchronization signal blocks (SSBs) may be sent using different beams, in accordance with certain aspects of the present disclosure.

FIG. 3B illustrates how different SSBs may be sent using different beams, in accordance with certain aspects of the present disclosure. As shown in FIG. 3B, the SSBs may be organized into SS burst sets to support beam sweeping. Each SSB within a burst set may be transmitted using a different beam, which may help a UE quickly acquire both transmit (TX) and receive (RX) beams (particular for mmW applications). A physical cell identity (PCI) may still be decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) of tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other BS may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Layer 1 (L1) and Layer 2 (L2) Based Mobility Procedures

Aspects of the present disclosure relate to wireless communications, and more particularly, to mobility techniques that allow for dynamically signaling mobility of a user equipment (UE) between a set of cells. As will be described in greater detail below, the UE may be configured with a set sells that support mobility based on Layer 1 (L1) (e.g., physical (PHY) layer) or Layer 2 (e.g., medium access control (MAC) layer) signaling. The UE may be configured to monitor and measure cells within the set and, based on the measurements, the UE may move from a source cell to a target cell, via a dynamically signaled mobility command.

The techniques presented herein may be applied in various bands utilized for New Radio (NR). For example, for the higher band referred to as frequency range 4 (FR4) (e.g., 52.6 GHz-114.25 GHz), an orthogonal frequency division multiplexed (OFDM) waveform with very large subcarrier spacing (SCS) (960 kHz-3.84 MHz) is required to combat severe phase noise. Due to the large SCS, the slot length tends to be very short. In a lower band referred to as frequency range 2 (FR2) (24.25 GHz to 52.6 GHz) with 120 kHz SCS, the slot length is 125 μSec, while in FR4 with 960 kHz, the slot length is 15.6 μSec.

In multi-beam operation (e.g., involving frequency range 1 (FR1) and FR2 bands), more efficient uplink (UL)/downlink (DL) beam management may allow for increased intra-cell and inter-cell mobility (e.g., L1 and/or L2-centric mobility) and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of L1 (PHY layer) or L2 (MAC layer) signaling, as opposed to higher layer (e.g., radio resource control (RRC)) signaling.

Figure 4:
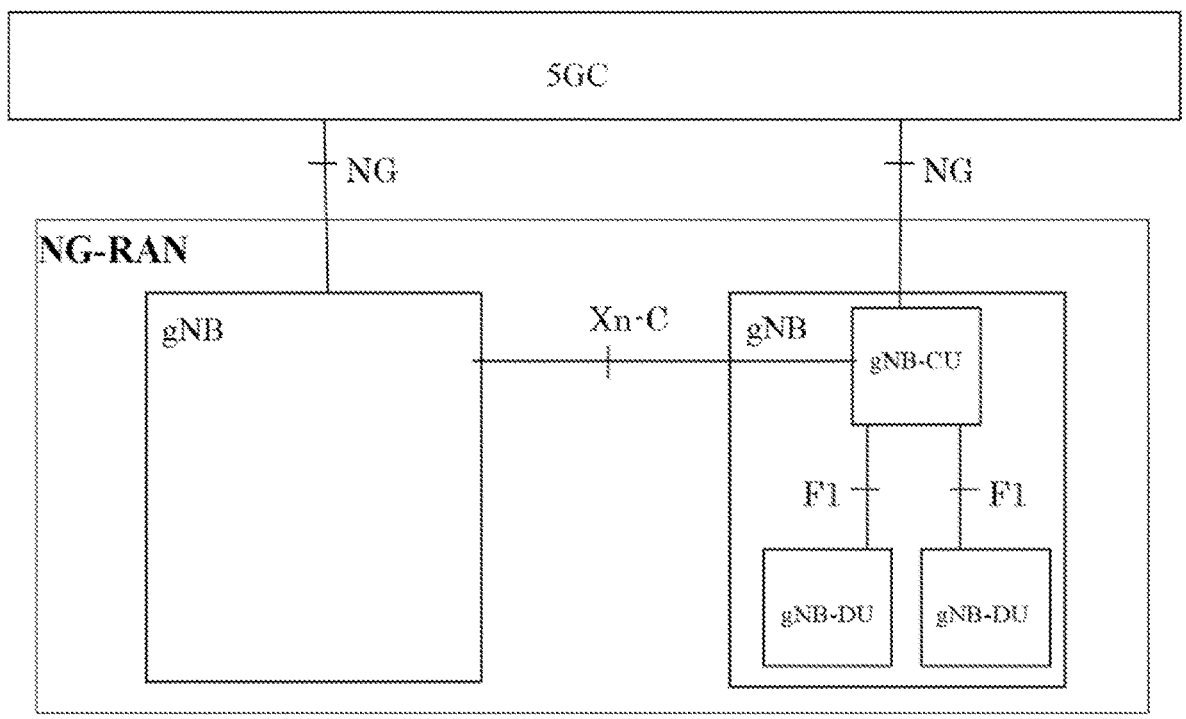
FIG. 4 illustrates an example architecture in which aspects of the present disclosure may be practiced.

FIG. 4 illustrates an example architecture in which aspects of the present disclosure may be practiced. As illustrated, the architecture includes a gNB Central Unit (gNB-CU). The gNB-CU generally serves as a logical node hosting RRC, Service Data Adaptation Protocol (SDAP), and packet data convergence protocol (PDCP) protocols of the gNB that control the operation of one or more gNB distributed units (gNB-DUs). As illustrated, the gNB-CU terminates an F1 interface connected with the gNB-DU.

A gNB-DU generally serves as a logical node hosting radio link control (RLC), MAC, and PHY layers of the gNB, and its operation is controlled by gNB-CU. As described in more detail with respect to FIGS. 5 and 6, one gNB-DU supports one or multiple cells (but each cell is supported by only one gNB-DU). The gNB-DU terminates the F1 interface connected with the gNB-CU.

Figure 5:
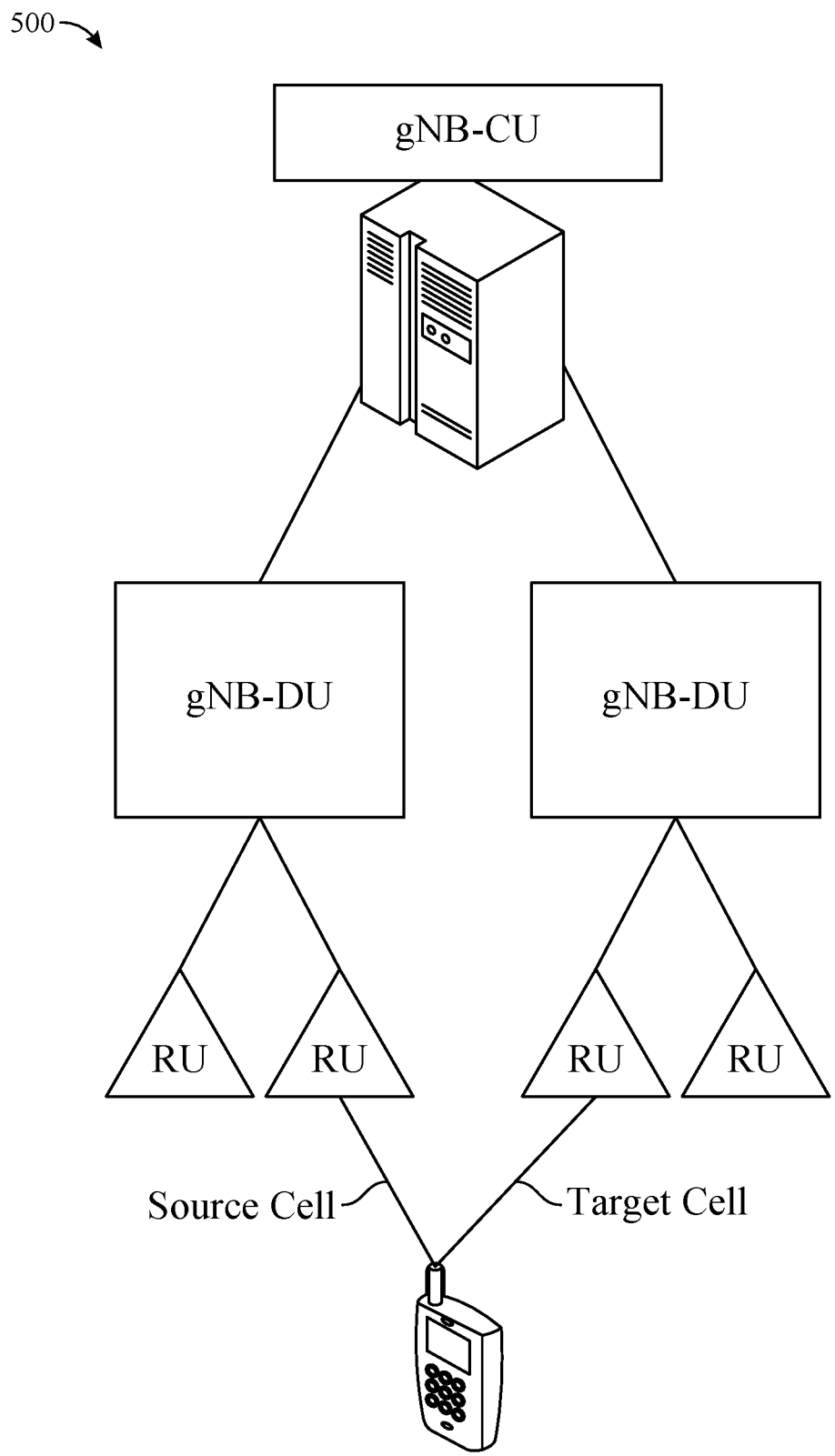
FIGS. 5 and 6 illustrate example scenarios in which aspects of the present disclosure may be practiced.
Figure 6:
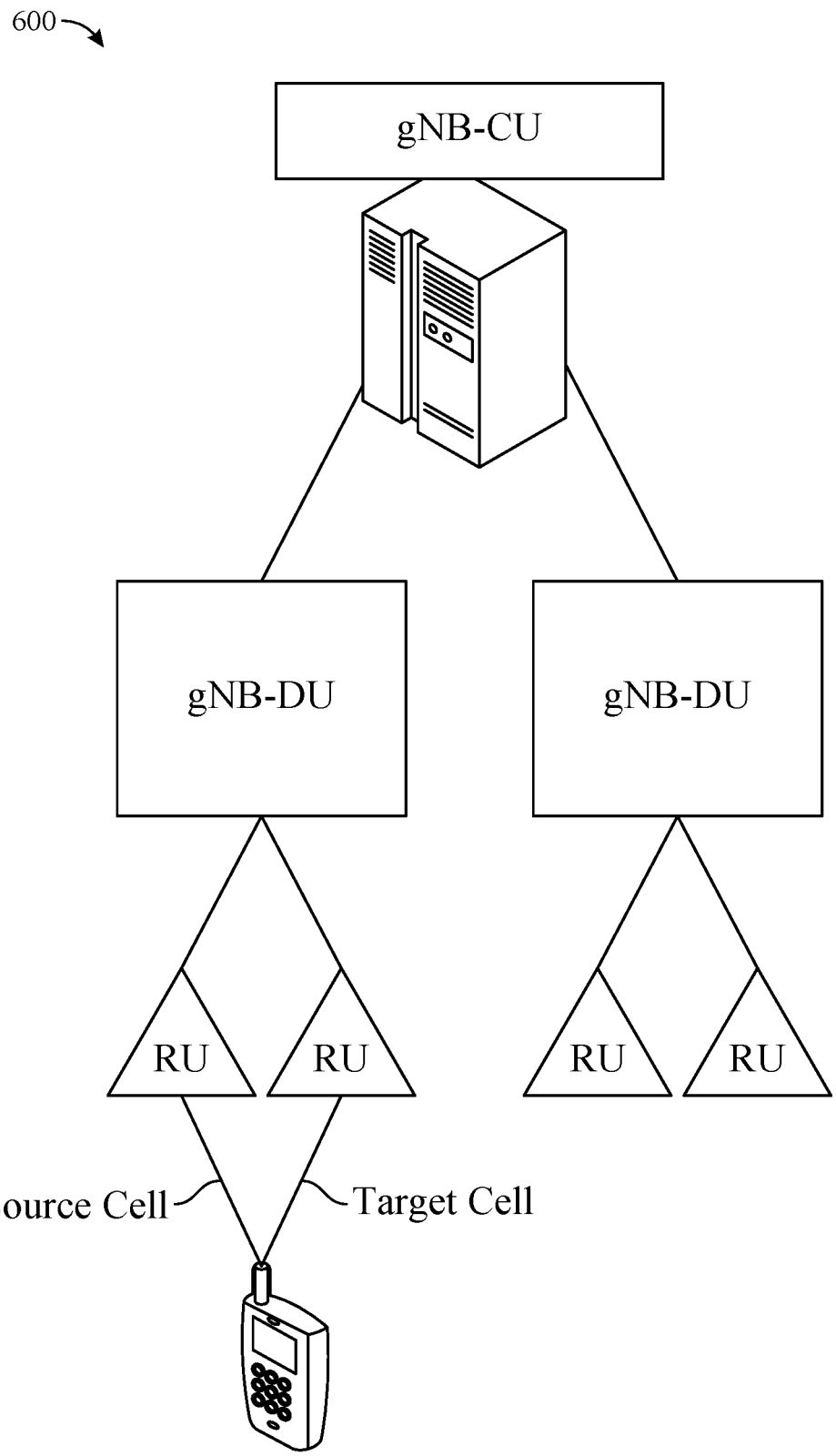

FIGS. 5 and 6 illustrate example scenarios in which aspects of the present disclosure may be practiced. As illustrated in FIG. 5, in some cases, a UE may be transferred (e.g., handed over) between (source and target) cells supported by (radio units or RUs of) different DUs under the same (e.g., common) CU. The RUs generally contain only PHY layer logic. In the scenario of FIG. 5, the cells may have non-collocated (in different DUs) PHY, MAC, and RLC logic, but common packet data convergence protocol (PDCP) and RRC logic (the same CU). While L1/L2 signaling techniques described herein may be used for mobility, the data path from PDCP to different RLCs present some control aspects that may be addressed by coordination between DUs.

In the scenario illustrated in FIG. 6, on the other hand, source and target cells may be supported by (belong to) the same DU. Thus, L1/L2 mobility may be particularly attractive in this scenario, as the cells can share MAC and upper layers (same DU). In this scenario, when moving a UE (e.g., in some cases, performing a handover) via L1/L2 signaling, the data path at MAC and above may stay the same.

As noted above, the distributed RUs contain only PHY layer and may be used (activated/de-activated) in a similar manner to carrier aggregation (CA), but cells may be on the same carrier frequencies. As such, aspects of the present disclosure, however, may utilize mechanisms similar to those used in CA to enable L1/L2 mobility (e.g., activating/de-activating cells).

Aspects of the present disclosure provide techniques that allow for dynamically signaling mobility of a user equipment (UE) between a set of cells and dynamically updating a set of cells and beams activated to serve the UE.

Aspects of the present disclosure may provide for seamless mobility within the activated cells in the activated cell set. In some cases, the signaling mechanism may be relatively similar to beam management. For example, mobility management within the activated set may be performed through L1/L2 signaling used to activate/deactivate cells in the activated and deactivated cell sets to select beams within the activated cells.

Figure 7:
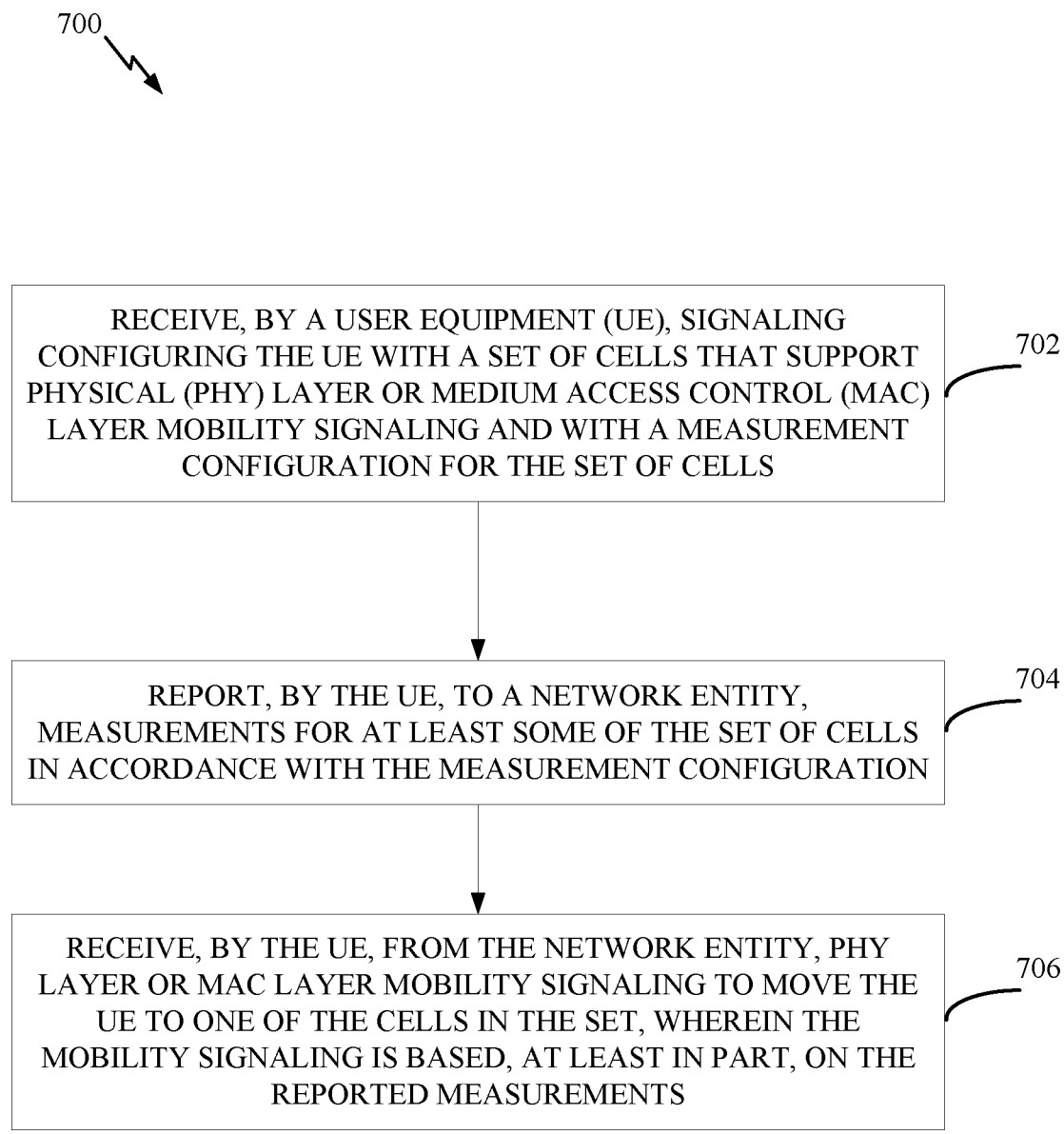
FIG. 7 is a flow diagram illustrating example operations for wireless communication by a user equipment (UE), in accordance with certain aspects of the present disclosure.

FIG. 7 is a flow diagram illustrating example operations 700 for wireless communication by a UE, in accordance with certain aspects of the present disclosure. Operations 700 may be performed, for example, by UE 120a illustrated in FIGS. 1 and 2.

The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280 of FIG. 2) obtaining and/or outputting signals.

Operations 700 begin, at block 702, by a UE receiving signaling configuring the UE with a set of cells that support PHY layer or MAC layer mobility signaling and with a measurement configuration for the set of cells. For example, the UE may be configured, via RRC signaling, with a set of cells as described in more detail with respect to the examples of FIGS. 10A and 10B. In some examples, the cells of the set of cells may belong to a common timing advance group (TAG). In some examples, the cells of the set of cells may be on the same carrier frequencies. In some examples, the cells of the set of cells may be on different carrier frequencies.

At block 704, the UE reports, to a network entity, measurements for at least some of the set of cells in accordance with the measurement configuration.

At block 706, the UE receives, from the network entity, PHY layer or MAC layer mobility signaling to move the UE to one of the cells in the set, wherein the mobility signaling is based, at least in part, on the reported measurements.

Figure 8:
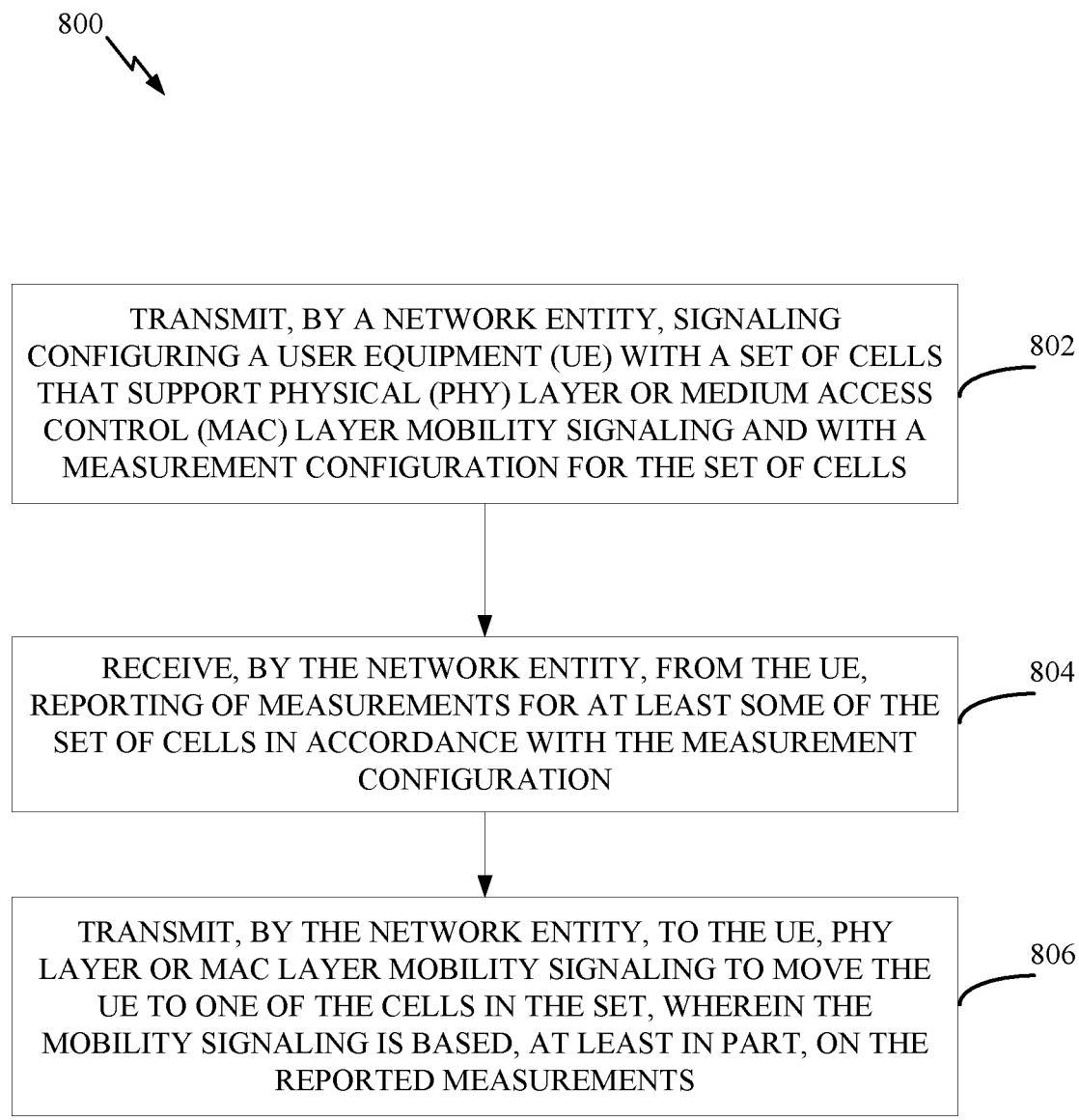
FIG. 8 is a flow diagram illustrating example operations for wireless communication by a network entity, in accordance with certain aspects of the present disclosure.

FIG. 8 is a flow diagram illustrating example operations 800 for wireless communication by a network entity, in accordance with certain aspects of the present disclosure. For example, operations 800 may be performed by a gNB distributed unit (DU)/centralized unit (CU) to dynamically transfer (e.g., handover) a UE (performing operations 700 of FIG. 7) within a set of cells. Operations 800 that may considered complementary to operations 700 of FIG. 7.

Operations 800 begin, at block 802, by a network entity transmitting signaling configuring a user equipment (UE) with a set of cells that support physical (PHY) layer or medium access control (MAC) layer mobility signaling and with a measurement configuration for the set of cells.

At block 804, the network entity receives, from the UE, reporting of measurements for at least some of the set of cells in accordance with the measurement configuration.

At block 806, the network entity transmits, to the UE, PHY layer or MAC layer mobility signaling to move the UE to one of the cells in the set, wherein the mobility signaling is based, at least in part, on the reported measurements.

Operations 700 and 800 of FIGS. 7 and 8 may be described with reference to FIG. 9 which is a call flow diagram that illustrates an example of dynamically signaled mobility, in accordance with certain aspects of the present disclosure.

Figure 9:
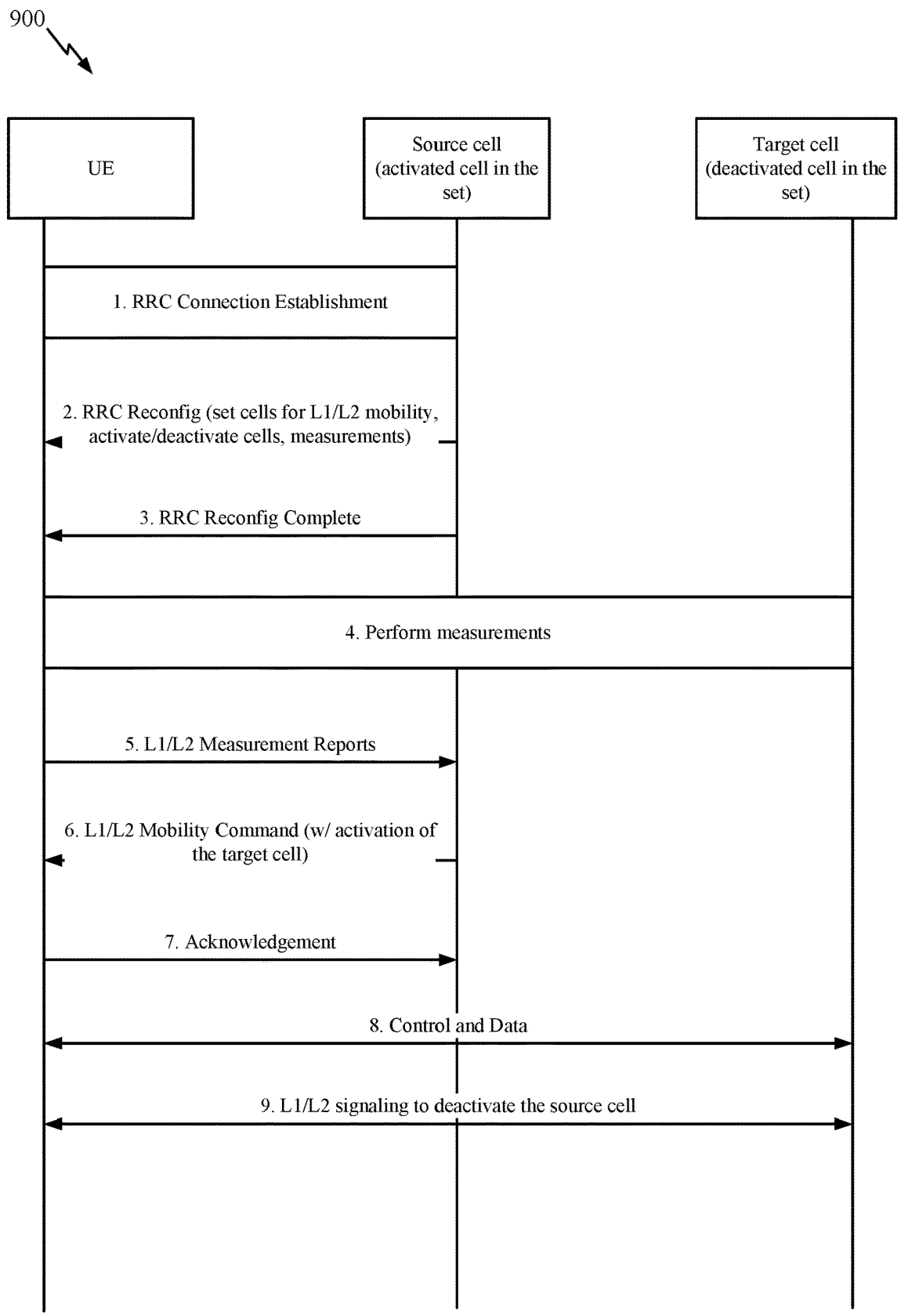
FIG. 9 is a call flow diagram illustrating a mobility procedure, in accordance with certain aspects of the present disclosure.

FIG. 9 is a call flow diagram illustrating a mobility procedure 900, in accordance with certain aspects of the present disclosure. RRC signaling may be used to configure a set of cells for L1/L2 mobility. In general, the cell set may be designed to be large enough to cover meaningful mobility (e.g., anticipated mobility of a UE within a given area and given time). As will be described below, mobility management may be performed by activating/de-activating cells in the set. From the configured set, at any given time, a certain set of cells may be activated. This activated cell set generally refers to a group of cells in the configured set that are activated.

As illustrated in FIG. 9, as an initial step, at step 1, a UE may establish an RRC connection with a source cell. While FIG. 9 illustrates an RRC connection with a source cell, in other examples, the UE may establish an RRC connection any one of the cells in the configured cell set.

After establishing RRC connection with the source cell at step 1, the UE may be configured (via an RRC reconfiguration message) at step 2 with a set of cells for L1/L2 mobility. The UE may send an RRC reconfiguration complete message, at step 3, acknowledging receipt of the configuration.

In some cases, this configuration may be similar to adding secondary cells (SCells) in carrier aggregation (CA), in that it may include necessary configuration of the cells in the set (e.g., System Information). The configuration may also indicate a current active/inactive state of the cells in the set. In other words, the configuration may indicate the activated cell set and deactivated cell set (as further described with respect to FIGS. 10A and 10B).

As illustrated, the UE may also receive a measurement configuration for the cells. The UE performs measurements according to the configuration, at step 4. In some cases, these measurements may be L1/L2 types of measurements. The UE may report these measurements at step 5.

Based on the measurement reports, the network (e.g., the MAC layer in the DU) may make a decision to transfer/move (e.g., handover) the UE to a one of the cells in the set using L1/L2 signaling, at step 6. In this case, the network may make a decision to transfer/move (e.g., handover) the UE to a target cell. In some cases, this signaling may convey a mobility command, essentially activating a cell from the configured set of cells.

In some cases, the source cell may be implicitly deactivated, depending on the UE capability. For example, a UE only capable of supporting a single cell may automatically disable the source cell, while a multi-cell capable UE may wait for an explicit command de-activating the source cell.

In cases where all the cells belong to the same DU (i.e., controlled by the same DU as shown in FIG. 6), the target cell (a newly activated cell) may be prepared for the UE once the L1/L2 mobility command is sent to the UE (at step 6).

The mobility timeline may need to be sufficient to allow for the UE to receive, process, and implement the command. In some cases, the source cell also may need to receive an acknowledgment from the UE (step 7) that it successfully received the L1/L2 mobility command.

Upon receiving the L1/L2 mobility command, the UE may preform actions similar to actions performed for SCell activation in CA scenarios. For example, the UE may transmit the target cell a power headroom report (PHR), a channel state information (CSI) report, and the like.

At step 8, the UE may begin (resume) communication in the target cell. One advantage to the L1/L2 mobility techniques described herein is that most of the protocol stack may not have to be reset after a UE moves from a first (activated) cell to another (recently activated) cell. For example, PDCP and RLC protocol stacks may not need to be reset (e.g., if the source and target cells have a common CU and DU as with the scenario shown in FIG. 6). In this case, because the MAC layer (of target and source cells) is also collocated, this layer may resume, as well, without a reset.

At step 9, the UE may receive signaling deactivating the source cell. As noted above, an L1/L2 mobility command may implicitly or explicitly deactivate the source cell. In some cases, deactivation may be applied after acknowledging the receipt of the command (step 7). As noted above, implicit or explicit deactivation may depend on whether the UE supports single or multiple cells. In some cases, if the UE is capable of communicating with multiple cells at the same time, a deactivation command for an active cell may be sent to the UE irrespective of the activation of another cell.

Figure 10A:
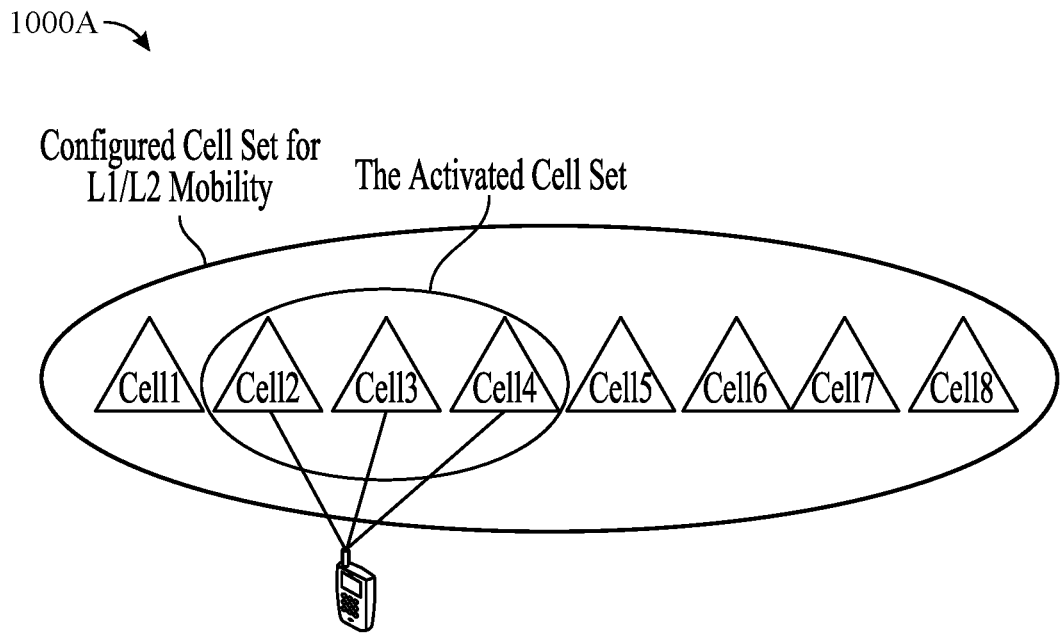
FIGS. 10A and 10B illustrate an example of UE mobility, in accordance with certain aspects of the present disclosure.
Figure 10B:
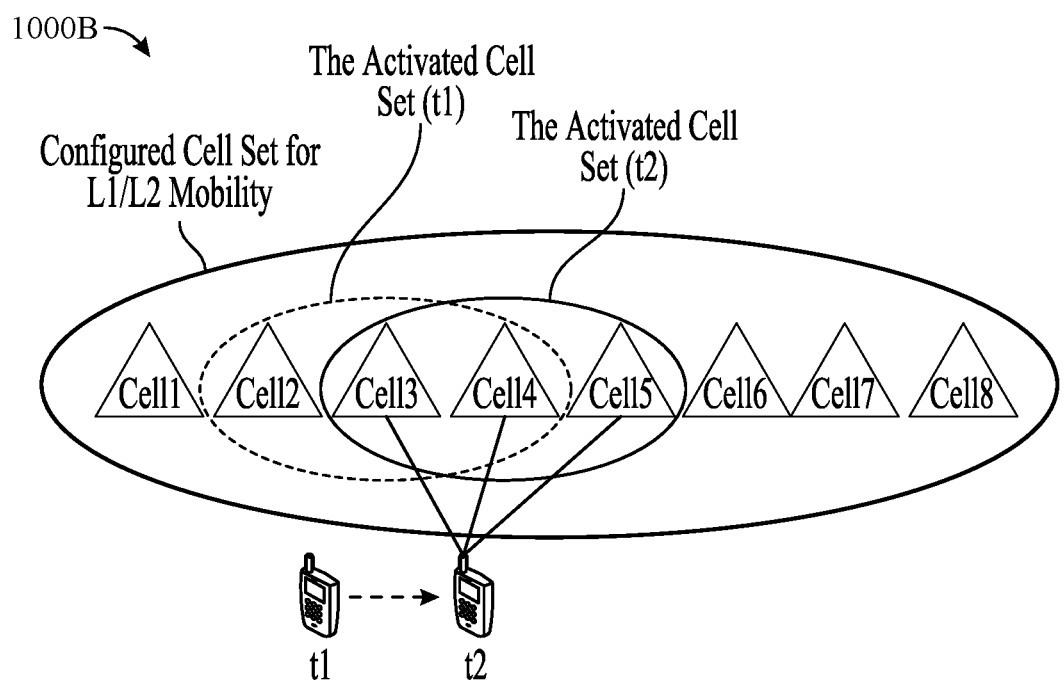

FIGS. 10A and 10B illustrate an example of UE mobility, in accordance with certain aspects of the present disclosure. As noted above, as an initial step, RRC signaling may be used to configure a set of cells for L1/L2 mobility. The example of FIGS. 10A and 10B assumes a configured set of eight cells (Cells1-8).

From the configured set, the activated cell set, at time t1, includes Cells 2-4. Configured cells that are not activated (a deactivated cell set) may include the (remaining) group of cells in in the configured set that are deactivated (not activated). As shown at time t1, the deactivated cell set includes Cell1 and Cells5-8.

As the UE moves, cells from the set are deactivated and activated, for example, based on signal quality (measurements reported by the UE) and other considerations (e.g., loading of the cells). In the example shown in FIG. 10B, as the UE moves from left (at time t1) to right (at time t2), Cell5 (which is now closer to the UE) is activated and Cell2 (which is now farther from the UE) is de-activated. The UE may update the activated cell set (e.g., activated for serving the UE) by adding Cell5 and removing Cell2. Thus, after the move, the activated cell set includes Cell3, Cell4, and Cell5.

The cells that are activated/deactivated by L1/L2 signaling may be based on network control, UE recommendation, or UE decision. In general, the L1/L2 signaling (e.g., DCI and/or MAC-CEs) may carry activation and/or deactivation commands (e.g., that indicate cells to be activated and cells to be deactivated).

If a UE is capable of supporting only one activated cell at a time, an activation command indicating a new cell could implicitly deactivate a currently active cell (e.g. upon UE acknowledging the command).

Figure 11A:
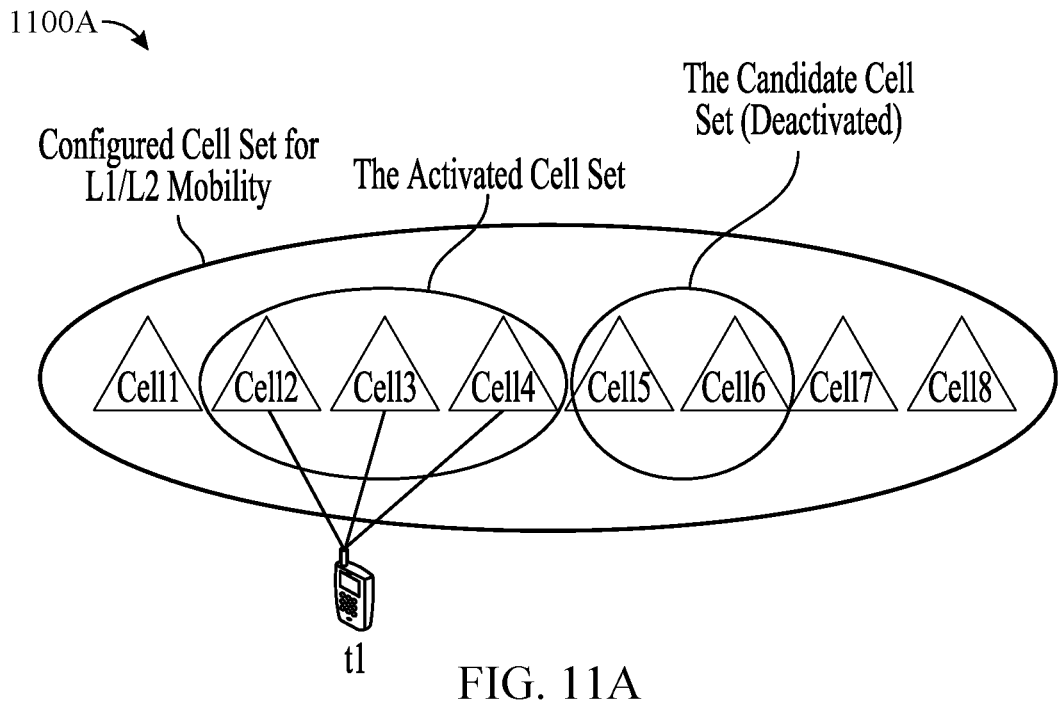
FIGS. 11A and 11B illustrate another example of UE mobility, in accordance with certain aspects of the present disclosure.
Figure 11B:
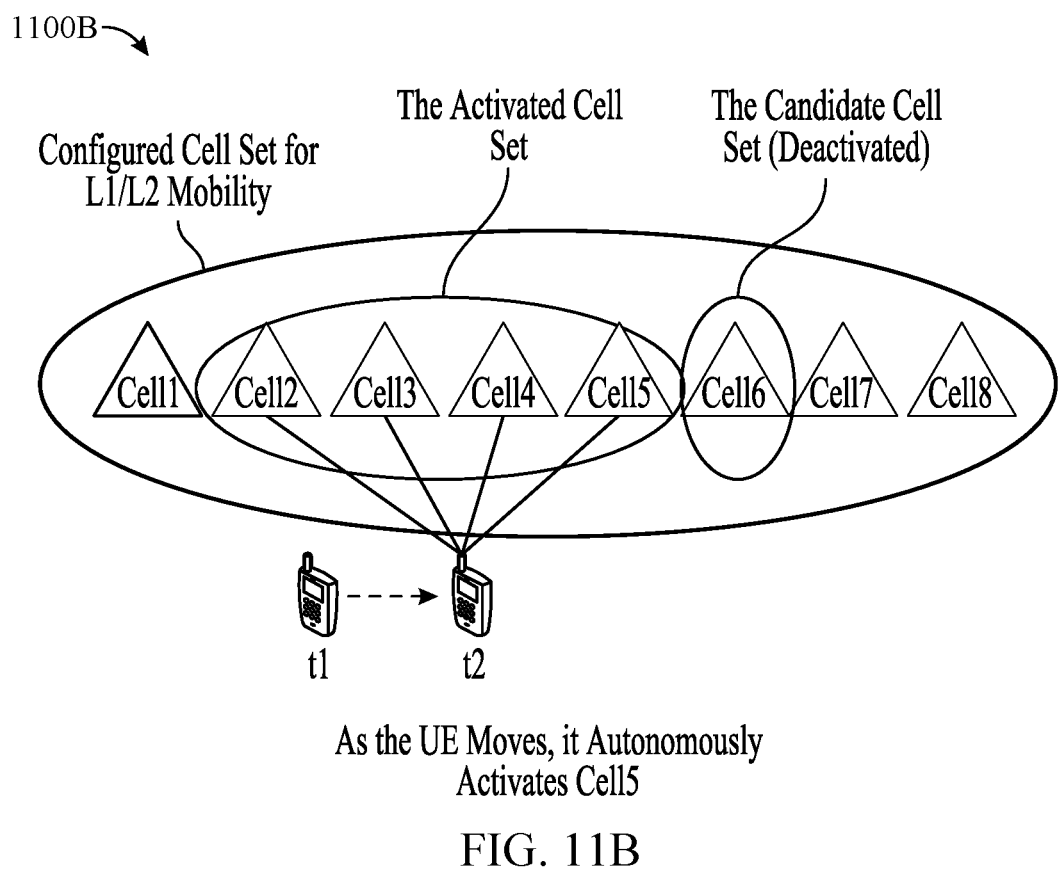

FIGS. 11A and 11B illustrate another example of UE mobility, in accordance with certain aspects of the present disclosure. As illustrated in FIG. 11A, in some cases, a UE may be provided with a subset of deactivated cells (referred to as a candidate cell set) from which the UE may be able to autonomously choose a cell to activate (and de-activate). For example, the UE may decide to activate or deactivate a cell from the candidate cell set based on measured channel quality, loading information, and the like.

In the example shown in FIG. 11A, at time t1, the UE may be provided with a candidate cell set that includes deactivated cells Cell5 and Cell6. As illustrated in FIG. 11B, as the UE moves to a new location, at time t2, the UE may autonomously decide to activate candidate Cell5, leaving Cell6 as the only deactivated cell in the candidate cell set.

Figure 12:
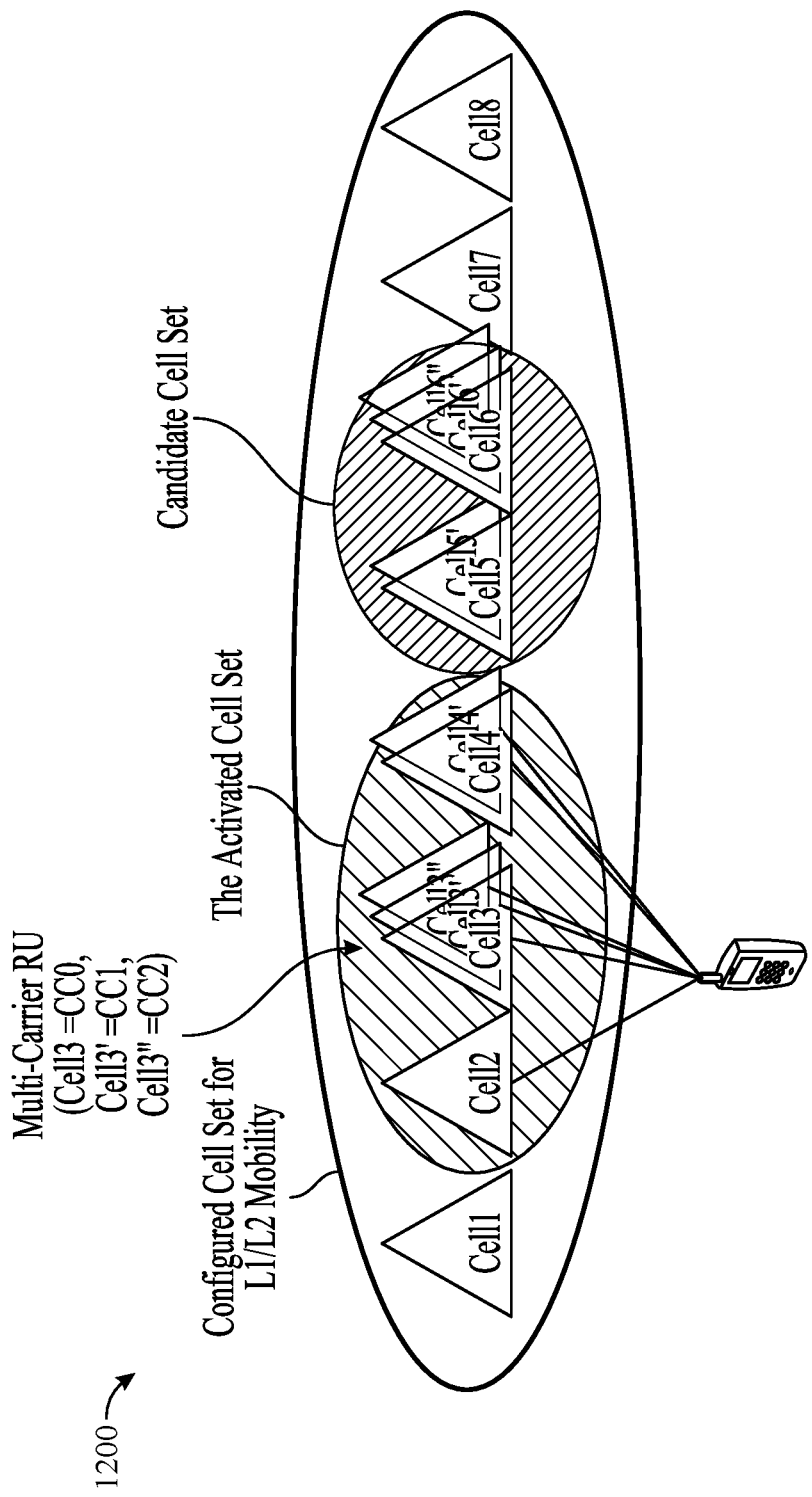
FIG. 12 illustrates example radio units (RUs) supporting multiple carriers, in accordance with certain aspects of the present disclosure.

In some cases, one or more of the RUs may have multiple carrier support (with each carrier being a cell). FIG. 12 illustrates example RUs supporting multiple carriers, in accordance with certain aspects of the present disclosure. In such cases, activation/deactivation of cells may be activated/deactivated in groups of carriers (cells). For example, as shown in FIG. 12, RUs for Cells3-6 may assume RUs support multiple carriers. In the illustrated example, the same RU may support Cell3 (on component carrier 0 (CC0), Cell3' (on CC1) and Cell3'' (on CC2). In this example, all three of the cells may be activated, de-activated at the same time.

According to certain aspects, a beam management mechanism may be used to perform beam selection within a set of activated cells as the UE moves and cells from the set are deactivated and activated. In some cases, mobility within the activated set may be based on beam management, with beam selection (selecting beams for communication) performed within the set of activated cells.

At any given time, a UE may be signaled by L1/L2 control signaling a subset of beams from the cells in the active set to monitor and measure. This set of beams, may be referred to as the active beam set. The UE may use at least one beam of the one or more selected beams to communicate in at least one cell of the set of activated cells. As described in details with respect to the example of FIGS. 14A and 14B, beams for communication may be selected from the active beam set.

Figure 13:
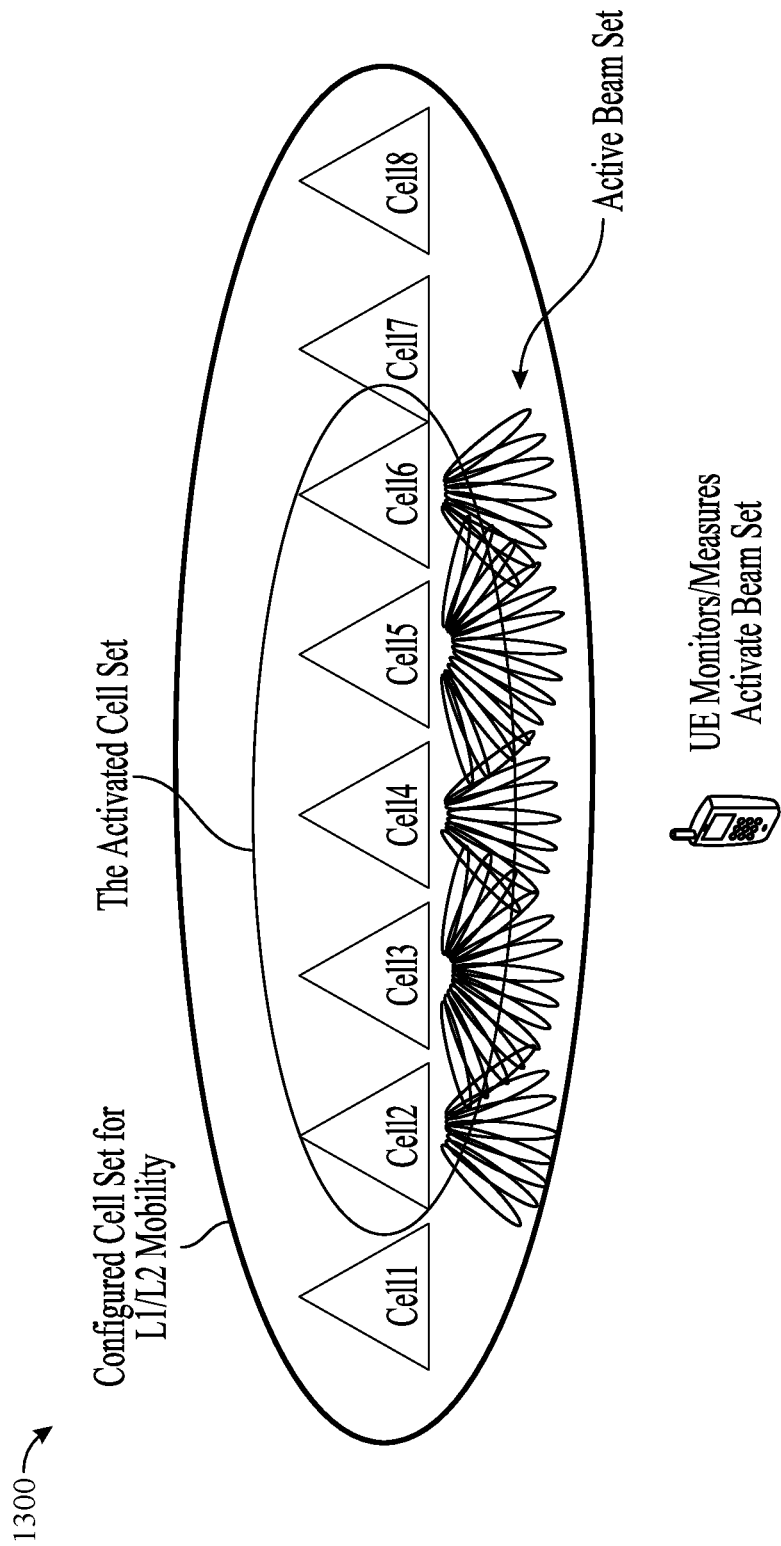
FIG. 13 illustrates an example active beam set, in accordance with certain aspects of the present disclosure.

FIG. 13 illustrates an example active beam set, in accordance with certain aspects of the present disclosure. The UE may be restricted to monitoring and measuring only beams in the active beam set. The network may change beams in the active set. Management of the active beam set may be done based on the quality of signals.

An upper limit of possible beams for the active beam set may be the number of beams supported by the active cells. Assuming the number of active cells is N, and that each cell supports 64 beams, the total number of possible beams would be N×64. For practical reasons, however, the active beam set may be limited to a smaller number (e.g., to be total of 64).

The UE may receive and transmit control information, and be scheduled for data communication, on the active beam set. The selection of communication beams from within the active beam set is controlled by L1/L2 signaling. Actual beams selected from within the active beam set may be based on network control, a UE recommendation, and/or a decision of the UE.

In some cases, a UE may decide on a best beam (or beams) for each of the active cells, and the network may then decide on the best beams from the plurality of the cells to actually use for communication. Beams may be selected using conventional signaling, for example, transmission configuration indicator (TCI) states in DCI.

Figure 14A:
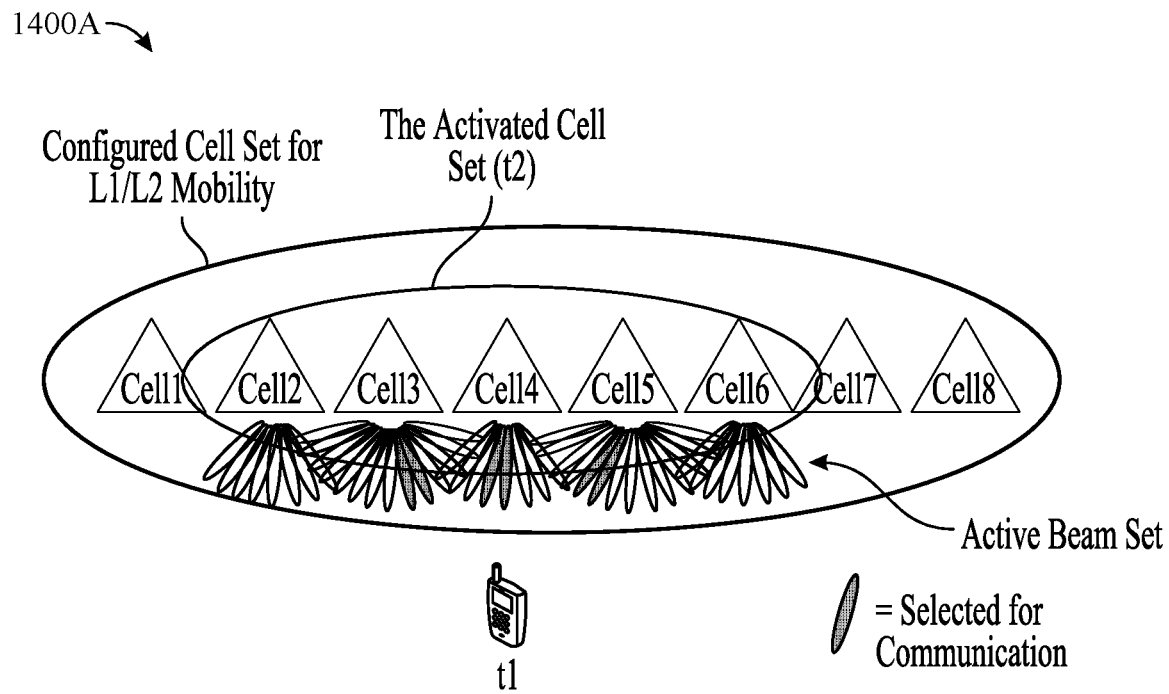
FIGS. 14A and 14B illustrate how different beams, from within an active beam set, may be selected for communication, in accordance with certain aspects of the present disclosure.
Figure 14B:
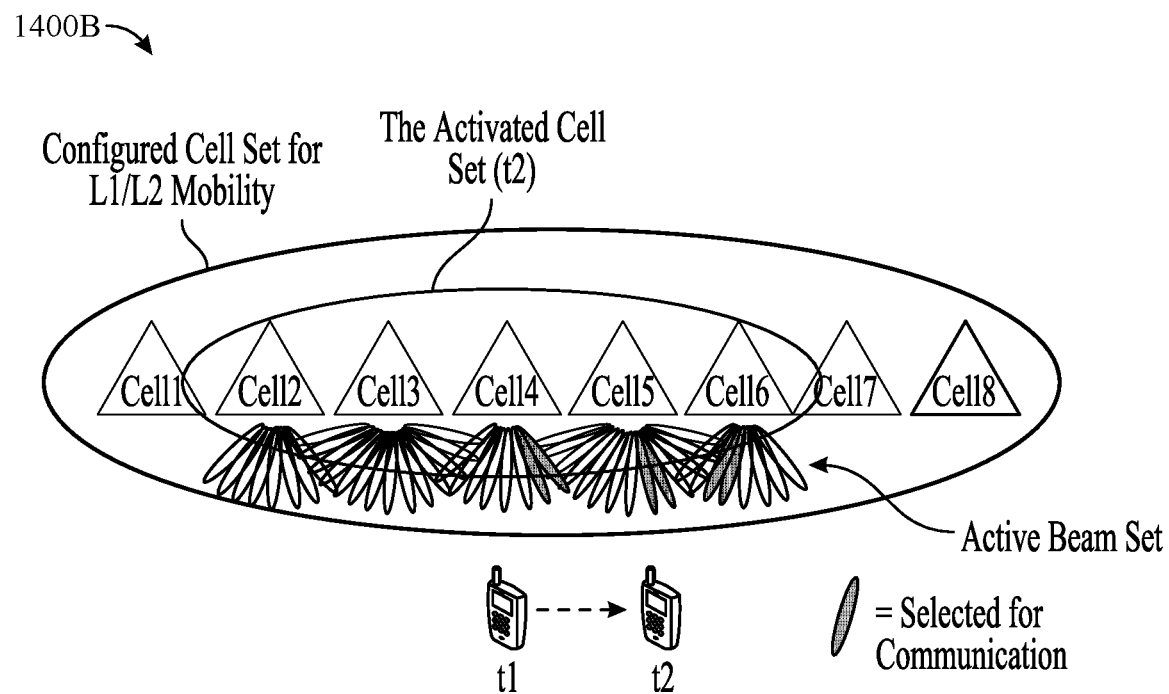

FIGS. 14A and 14B illustrate how different beams, from within an active beam set, may be selected for communication as a UE moves, in accordance with certain aspects of the present disclosure. As illustrated in FIG. 14A, at time t1, a first set of beams may be selected from the active beam set for communications. In the illustrated example, two beams each from Cell3, Cell4, and Cell5 may be selected. As shown in FIG. 14B, however, as the UE moves to the right, a different set of beams may be selected form the active beam set for communications. In the illustrated example, two beams each from Cell4, Cell5, and Cell6 may be selected for communications.

Example Wireless Communications Devices

Figure 15:
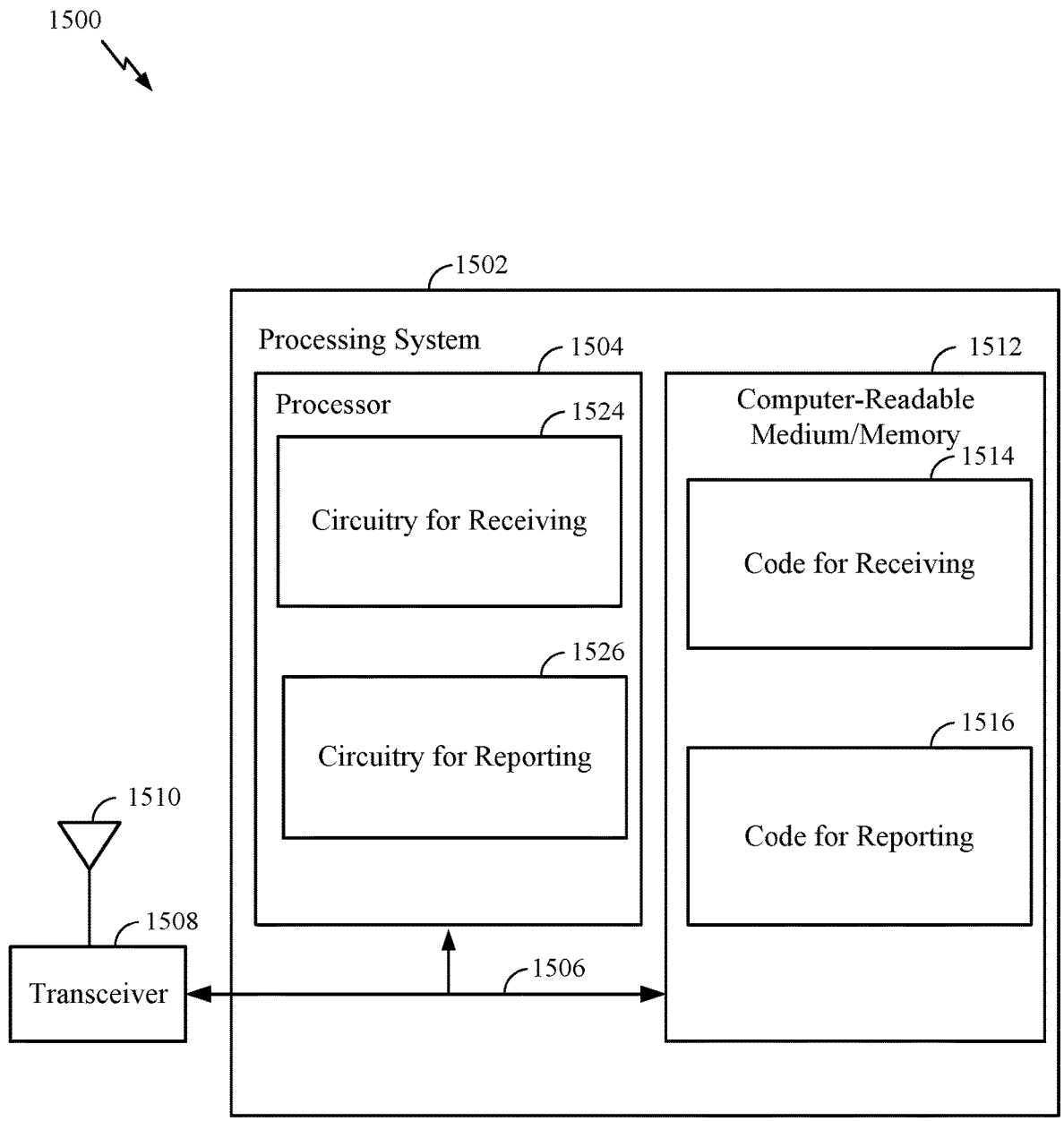
FIG. 15 illustrates a communications device 1500 that includes various components operable, configured, or adapted to perform operations for the techniques disclosed herein, such as the operations illustrated in FIGS. 7 and 9, in accordance with certain aspects of the present disclosure.

FIG. 15 illustrates a communications device 1500 that includes various components operable, configured, or adapted to perform operations for the techniques disclosed herein, such as the operations illustrated in FIGS. 7 and 9. In some examples, communications device 1500 may be a user equipment (UE), such as UE 120a described with respect to FIGS. 1 and 2.

Communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

Processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIGS. 7 and 9, or other operations for performing the various techniques discussed herein.

In certain aspects, computer-readable medium/memory 1512 stores code 1514 for receiving and code 1516 for reporting.

In some cases, code 1514 for receiving may include code for receiving signaling configuring the UE with a set of cells that support physical (PHY) layer or medium access control (MAC) layer mobility signaling and with a measurement configuration for the set of cells. In some cases, code 1514 for receiving may include code for receiving, from the network entity, PHY layer or MAC layer mobility signaling to move the UE to one of the cells in the set, wherein the mobility signaling is based, at least in part, on the reported measurements. In some cases, code 1516 for reporting may include code for reporting, to a network entity, measurements for at least some of the set of cells in accordance with the measurement configuration.

In certain aspects, the processor 1504 has circuitry configured to implement the code stored in the computer-readable medium/memory 1512. The processor 1504 includes circuitry 1524 for receiving and circuitry 1526 for reporting.

In some cases, circuitry 1524 for receiving may include circuitry for receiving signaling configuring the UE with a set of cells that support PHY layer or MAC layer mobility signaling and with a measurement configuration for the set of cells. In some cases, circuitry 1524 for receiving may include circuitry for receiving, from the network entity, PHY layer or MAC layer mobility signaling to move the UE to one of the cells in the set, wherein the mobility signaling is based, at least in part, on the reported measurements. In some cases, circuitry 1526 for reporting may include circuitry for reporting, to a network entity, measurements for at least some of the set of cells in accordance with the measurement configuration.

In some cases, the operations illustrated in FIG. 7, as well as other operations described herein, may be implemented by one or more means-plus-function components. For example, in some cases, such operations may be implemented by means for determining and means for providing.

In some cases, means for reporting includes a processing system, which may include one or more processors, such as the receive processor 258, the transmit processor 264, the TX MIMO processor 266, and/or the controller/processor 280 of the UE 120a illustrated in FIG. 2 and/or the processing system 1502 of the communication device 1500 in FIG. 15.

The transceiver 1508 may provide a means for receiving or transmitting information such as packets, user data, or control information associated with various information channels (e.g., control channels, data channels, information related to SR, etc.). Information may be passed on to other components of the communications device 1500. The antenna 1510 may correspond to a single antenna or a set of antennas. The transceiver 1508 may provide means for transmitting signals generated by other components of the communications device 1500.

Means for receiving or means for obtaining may include a receiver (such as the receive processor 258 or antenna(s) 252 of the UE 120a illustrated in FIG. 2. Means for transmitting or means for outputting may include a transmitter (such as the transmit processor 264) or antenna(s) 252 of the UE 120a illustrated in FIG. 2.

Notably, FIG. 15 is just use one example, and many other examples and configurations of communications device 1500 are possible.

Figure 16:
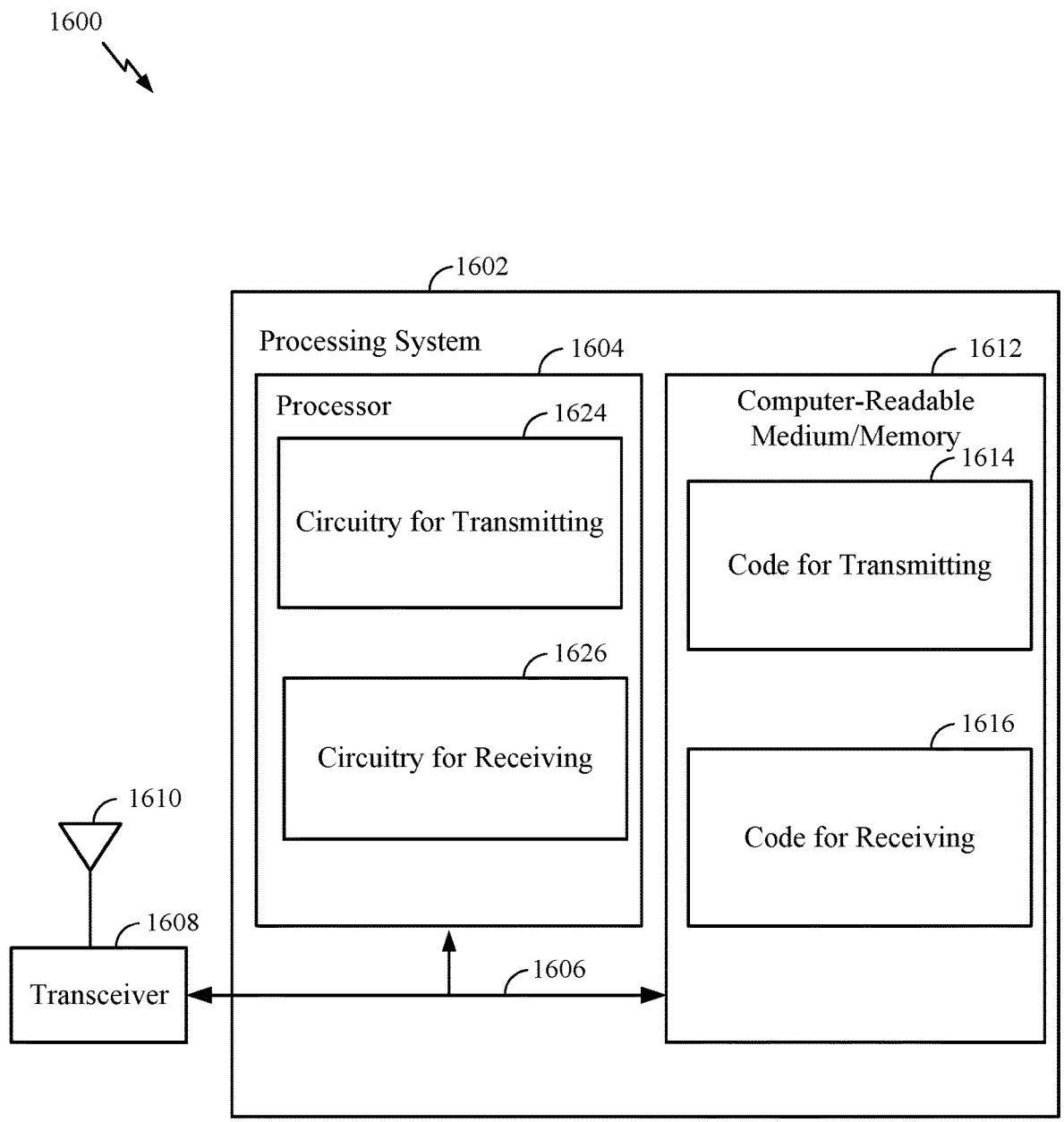
FIG. 16 illustrates a communications device 1500 that includes various components operable, configured, or adapted to perform operations for the techniques disclosed herein, such as the operations illustrated in FIGS. 8 and 9, in accordance with certain aspects of the present disclosure.

FIG. 16 illustrates a communications device 1600 that includes various components operable, configured, or adapted to perform operations for the techniques disclosed herein, such as the operations illustrated in FIGS. 8 and 9. In some examples, communications device 1600 may be a network entity or base station (BS) (e.g., gNB), such as BS 110 described with respect to FIGS. 1 and 2.

Communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

Processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIGS. 8 and 9, or other operations for performing the various techniques discussed herein.

In certain aspects, computer-readable medium/memory 1612 stores code 1614 for transmitting and code 1616 for receiving.

In some cases, code 1614 for transmitting may include code for transmitting signaling configuring a UE with a set of cells that support PHY layer or MAC layer mobility signaling and with a measurement configuration for the set of cells. In some cases, code 1614 for transmitting may include code for transmitting, to the UE, PHY layer or MAC layer mobility signaling to move the UE to one of the cells in the set, wherein the mobility signaling is based, at least in part, on the reported measurements. In some cases, code 1616 for receiving may include code for receiving, from the UE, reporting of measurements for at least some of the set of cells in accordance with the measurement configuration.

In certain aspects, the processor 1604 has circuitry configured to implement the code stored in the computer-readable medium/memory 1612. The processor 1604 includes circuitry 1624 for transmitting and circuitry 1626 for receiving.

In some cases, circuitry 1624 for transmitting may include circuitry for transmitting signaling configuring a UE with a set of cells that support PHY layer or MAC layer mobility signaling and with a measurement configuration for the set of cells. In some cases, circuitry 1624 for transmitting may include circuitry for transmitting, to the UE, PHY layer or MAC layer mobility signaling to move the UE to one of the cells in the set, wherein the mobility signaling is based, at least in part, on the reported measurements. In some cases, circuitry 1626 for receiving may include circuitry for receiving may include code for receiving, from the UE, reporting of measurements for at least some of the set of cells in accordance with the measurement configuration.

The transceiver 1608 may provide a means for receiving or transmitting information such as packets, user data, or control information associated with various information channels (e.g., control channels, data channels, information related to SR, etc.). Information may be passed on to other components of the communications device 1600. The antenna 1610 may correspond to a single antenna or a set of antennas. The transceiver 1608 may provide means for transmitting signals generated by other components of the communications device 1600.

Means for receiving or means for obtaining may include a receiver (such as the receive processor 238) or antenna(s) 234 of the BS 110 illustrated in FIG. 2. Means for transmitting or means for outputting may include a transmitter (such as the transmit processor 220) or antenna(s) 234 of the BS 110 illustrated in FIG. 2.

Notably, FIG. 16 is just use one example, and many other examples and configurations of communications device 1600 are possible.

Example Clauses

Implementation examples are described in the following numbered clauses:

Clause 1: A method for wireless communications by a user equipment (UE), comprising: receiving signaling configuring the UE with a set of cells that support physical (PHY) layer or medium access control (MAC) layer mobility signaling and with a measurement configuration for the set of cells; reporting, to a network entity, measurements for at least some of the set of cells in accordance with the measurement configuration; and receiving, from the network entity, PHY layer or MAC layer mobility signaling to move the UE to one of the cells in the set, wherein the mobility signaling is based, at least in part, on the reported measurements.

Clause 2: The method of Clause 1, wherein the set of cells are supported by one or more distributed units (DUs) under a common central unit (CU).

Clause 3: The method of Clause 2, wherein the one or more DUs comprises a common DU that supports each cell of the set of cells.

Clause 4: The method of any of Clauses 1-3, wherein the signaling indicating the set of cells comprises radio resource control (RRC) signaling.

Clause 5: The method of any of Clauses 1-4, wherein the cells of the set of cells belong to a common timing advance group (TAG).

Clause 6: The method of any of Clauses 1-5, wherein the cells of the set of cells are on the same carrier frequencies.

Clause 7: The method of any of Clauses 1-6, wherein the mobility signaling comprises a mobility command to at least one of: activate a cell not currently in a subset of the set of cells activated for serving the UE; or de-activate one of the cells in the subset of the set of cells activated for serving the UE.

Clause 8: The method of Clause 7, further comprising: identifying a subset of the set of cells activated for serving the UE prior to receiving the mobility signaling; and in response to receiving the mobility signaling, updating the subset of activated cells based on the mobility signaling.

Clause 9: The method of Clause 8, wherein the updating comprises at least one of: adding a cell activated by the mobility signaling to the subset of cells activated for serving the UE; or removing a cell de-activated by the mobility signaling from the subset of cells activated for serving the UE.

Clause 10: The method of any of Clauses 1-9, further comprising: signaling a recommendation of at least one of: one or more cells to activate; or one or more cells to de-activate; and receiving the mobility signaling after signaling the recommendation.

Clause 11: The method of any of Clauses 7-10, wherein: activation of one or more cells indicated by the mobility signaling implicitly deactivates one or more currently active cells; and wherein the implicit deactivation is based on a limited capability or an incapability of the UE to support multiple cells.

Clause 12: The method of Clause 11, wherein the implicit deactivation applies after the UE acknowledges the mobility signaling.

Clause 13: The method of any of Clauses 7-12, wherein whether or not the UE receives mobility signaling to de-activate cells explicitly is based on capability of the UE to support multiple cells.

Clause 14: The method of any of Clauses 7-13, wherein: one or more of the cells is implemented by a radio unit (RU) that supports multiple carriers each associated with a cell; and the UE activates or deactivates all cells associated with an RU that supports multiple carriers.

Clause 15: The method of any of Clauses 8-14, in response to updating the subset of activated cells based on the mobility signaling, further comprising: receiving PHY layer or MAC layer signaling to select beams within the updated subset of activated cells.

Clause 16: The method of any of Clauses 8-15, further comprising: receiving an indication of an active beam set corresponding to the updated subset of activated cells, wherein the active beam set comprises a subset of beams supported by the updated subset of activated cells.

Clause 17: The method of Clause 16, further comprising: signaling a recommendation indicating one or more beams to include in the active beam set corresponding to the updated subset of activated cells; and wherein the active beam set is based, at least in part, on the recommendation.

Clause 18: The method of Clause 16 or 17, further comprising reporting at least one measurement for at least one beam of the active beam set via at least one of: PHY layer signaling, wherein the at least one measurement comprises a PHY layer measurement; or MAC layer signaling, wherein the at least one measurement comprises a MAC layer measurement.

Clause 19: The method of Clause 18, further comprising: receiving PHY layer signaling or MAC layer signaling indicating a selection of one or more beams corresponding to one or more cells of the subset of the set of cells activated for serving the UE prior to receiving the mobility signaling, wherein the selection of the one or more beams is based, at least in part, on the at least one measurement; and using at least one beam of the one or more selected beams to communicate in at least one cell of the one or more cells of the updated subset of activated cells.

Clause 20: The method of any of Clauses 16-19, further comprising: modifying the active beam set based, at least in part, on one or more beam measurements.

Clause 21: The method of any of Clauses 8-20, wherein: the mobility command is transmitted from a source cell to move the UE to a target cell; and the method further comprises transmitting an acknowledgment of the mobility command to the source cell.

Clause 22: The method of Clause 21, further comprising forwarding at least one of a power headroom report (PHR) or channel state information (CSI) report to the target cell.

Clause 23: The method of Clause 21 or 22, further comprising deactivating the source cell after acknowledging the mobility command.

Clause 24: The method of any of Clauses 21-23, further comprising: receiving PHY layer or MAC layer signaling from the target cell to deactivate the source cell.

Clause 25: The method of any of Clauses 21-24, further comprising resuming communications in the target cell without resetting one or more of a packet data convergence protocol (PDCP), a radio link control (RLC), or a media access control (MAC) protocol stack.

Clause 26: The method of any of Clauses 1-25, further comprising: receiving signaling indicating a subset of candidate cells for the UE to autonomously activate based on one or more criteria related to at least one of: measured channel quality; or loading information.

Clause 27: A method for wireless communications by a network entity, comprising: transmitting signaling configuring a user equipment (UE) with a set of cells that support physical (PHY) layer or medium access control (MAC) layer mobility signaling and with a measurement configuration for the set of cells; receiving, from the UE, reporting of measurements for at least some of the set of cells in accordance with the measurement configuration; and transmitting, to the UE, PHY layer or MAC layer mobility signaling to move the UE to one of the cells in the set, wherein the mobility signaling is based, at least in part, on the reported measurements.

Clause 28: The method of Clause 27, wherein the set of cells are supported by one or more distributed units (DUs) under a common central unit (CU).

Clause 29: An apparatus, comprising: at least one processor and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus for wireless communications by a user equipment (UE), comprising:
one or more processors; and
one or more memories coupled with the one or more processors and that store processor-executable code that, when executed by the one or more processors, is configured to cause the UE to:
receive signaling configuring the UE with a set of cells that support physical (PHY) layer or medium access control (MAC) layer mobility signaling and with a measurement configuration for the set of cells;
report, to a network entity, measurements for at least some cells in the set of cells in accordance with the measurement configuration;
identify a subset of the set of cells activated for serving the UE;
receive, from the network entity, PHY layer or MAC layer mobility signaling to move the UE to one of the cells in the set of cells, wherein the mobility signaling is based, at least in part, on the reported measurements; and in response to receiving the mobility signaling, update the subset of activated cells based on the mobility signaling.

2. The apparatus of claim 1, wherein the set of cells are supported by one or more distributed units (DUs) under a common central unit (CU).

3. The apparatus of claim 2, wherein the one or more DUs comprises a common DU that supports each cell of the set of cells.

4. The apparatus of claim 1, wherein the signaling indicating the set of cells comprises radio resource control (RRC) signaling.

5. The apparatus of claim 1, wherein the cells of the set of cells belong to a common timing advance group (TAG).

6. The apparatus of claim 1, wherein the cells of the set of cells are on the same carrier frequencies.

7. The apparatus of claim 1, wherein, in order to update the subset of activated cells, the one or more processors are configured to cause the UE to at least one of:

adding a cell activated by the mobility signaling to the subset of cells activated for serving the UE; or removing a cell de-activated by the mobility signaling from the subset of cells activated for serving the UE.

8. The apparatus of claim 1, wherein the one or more processors are further configured to cause the UE to:

signal a recommendation of at least one of:
one or more cells to activate; or
one or more cells to de-activate; and
receive the mobility signaling after signaling the recommendation.

9. The apparatus of claim 1, in response to updating the subset of activated cells based on the mobility signaling, the one or more processors are further configured to cause the UE to receive PHY layer or MAC layer signaling to select beams within the updated subset of activated cells.

10. The apparatus of claim 1, wherein the one or more processors are further configured to cause the UE to receive an indication of an active beam set corresponding to the updated subset of activated cells, and wherein the active beam set comprises a subset of beams supported by the updated subset of activated cells.

11. The apparatus of claim 10, wherein the one or more processors are further configured to cause the UE to signal a recommendation indicating one or more beams to include in the active beam set corresponding to the updated subset of activated cells and wherein the active beam set is based, at least in part, on the recommendation.

12. The apparatus of claim 10, wherein the one or more processors are further configured to cause the UE to report at least one measurement for at least one beam of the active beam set via at least one of:

PHY layer signaling, wherein the at least one measurement comprises a PHY layer measurement; or
MAC layer signaling, wherein the at least one measurement comprises a MAC layer measurement.

13. The apparatus of claim 12, wherein the one or more processors are further configured to cause the UE to:

receive PHY layer signaling or MAC layer signaling indicating a selection of one or more beams corresponding to one or more cells of the subset of the set of cells activated for serving the UE prior to receiving the mobility signaling, wherein the selection of the one or more beams is based, at least in part, on the at least one measurement; and use at least one beam of the one or more selected beams to communicate in at least one cell of the one or more cells of the updated subset of activated cells.

14. The apparatus of claim 10, wherein the one or more processors are further configured to cause the UE to modify the active beam set based, at least in part, on one or more beam measurements.

15. The apparatus of claim 1, wherein:

the mobility command is transmitted from a source cell to move the UE to a target cell; and wherein the one or more processors are further configured to cause the UE to transmit an acknowledgment of the mobility command to the source cell.

16. The apparatus of claim 15, wherein the one or more processors are further configured to cause the UE to forward at least one of a power headroom report (PHR) or channel state information (CSI) report to the target cell.

17. The apparatus of claim 15, wherein the one or more processors are further configured to cause the UE to deactivate the source cell after acknowledging the mobility command.

18. The apparatus of claim 15, wherein the one or more processors are further configured to cause the UE to receive PHY layer or MAC layer signaling from the target cell to deactivate the source cell.

19. The apparatus of claim 15, wherein the one or more processors are further configured to cause the UE to resume communications in the target cell without resetting one or more of a packet data convergence protocol (PDCP), a radio link control (RLC), or a media access control (MAC) protocol stack.

20. The apparatus of claim 1, wherein the one or more processors are further configured to cause the UE to receive signaling indicating a subset of candidate cells for the UE to autonomously activate based on one or more criteria related to at least one of:

measured channel quality; or
loading information.

21. An apparatus for wireless communications by a user equipment (UE), comprising:

one or more processors; and one or more memories coupled with the one or more processors and that store processor-executable code that, when executed by the one or more processors, is configured to cause the UE to:

receive signaling configuring the UE with a set of cells that support physical (PHY) layer or medium access control (MAC) layer mobility signaling and with a measurement configuration for the set of cells;

report, to a network entity, measurements for at least some cells in the set of cells in accordance with the measurement configuration;

receive, from the network entity, PHY layer or MAC layer mobility signaling to move the UE to one of the cells in the set of cells, wherein:

the mobility signaling comprises a mobility command to at least one of:

activate one or more cells not currently in a subset of cells, of the set of cells activated for serving the UE; or de-activate one or more cells in a subset of cells, of the set of cells, activated for serving the UE; and the activation or the de-activation of the one or more cells indicated by the mobility signaling is based on a capability of the UE to support multiple cells.

22. The apparatus of claim 21, wherein: the activation of the one or more cells indicated by the mobility signaling implicitly deactivates one or more currently active cells and is based on a limited capability or an incapability of the UE to support the multiple cells.

23. The apparatus of claim 22, wherein the implicit deactivation applies after the UE acknowledges the mobility signaling.

24. The apparatus of claim 21, wherein whether or not the UE receives the mobility signaling to de-activate cells explicitly is based on the capability of the UE to support multiple cells.

25. The apparatus of claim 21, wherein:
the one or more cells are implemented by a radio unit (RU) that supports multiple carriers each associated with a cell; and
the UE activates or deactivates all cells associated with the RU that supports multiple carriers.

26. An apparatus for wireless communications by a network entity, comprising:
one or more processors; and
one or more memories coupled with the one or more processors and that store processor-executable code that, when executed by the one or more processors, is configured to cause the network entity to:
transmit signaling configuring a user equipment (UE) with a set of cells that support physical (PHY) layer or medium access control (MAC) layer mobility signaling and with a measurement configuration for the set of cells;
receive, from the UE, reporting of measurements for at least some of the set of cells in accordance with the measurement configuration; and
transmit, to the UE, PHY layer or MAC layer mobility signaling to move the UE to one of the cells in the set, wherein:
the mobility signaling is based, at least in part, on the reported measurements;
the mobility signaling comprises a mobility command to at least one of:
activate one or more cells not currently in a subset of cells, of the set of cells, activated for serving the UE; or
de-activate one or more cells in a subset of cells, of the set of cells, activated for serving the UE; and
the activation or the de-activation of the one or more cells indicated by the mobility signaling is based on a capability of the UE to support multiple cells.

27. The apparatus of claim 26, wherein the set of cells are supported by one or more distributed units (DUs) under a common central unit (CU).

28. A method for wireless communication by a user equipment (UE), comprising:
receiving signaling configuring the UE with a set of cells that support physical (PHY) layer or medium access control (MAC) layer mobility signaling and with a measurement configuration for the set of cells;
reporting, to a network entity, measurements for at least some of the set of cells in accordance with the measurement configuration; and identifying a subset of the set of cells activated for serving the UE;
receiving, from the network entity, PHY layer or MAC layer mobility signaling to move the UE to one of the cells in the set of cells, wherein the mobility signaling is based, at least in part, on the reported measurements; and
in response to receiving the mobility signaling, updating the subset of activated cells based on the mobility signaling.

29. A method for wireless communication by a network entity, comprising:
transmitting signaling configuring a user equipment (UE) with a set of cells that support physical (PHY) layer or medium access control (MAC) layer mobility signaling and with a measurement configuration for the set of cells;
receiving, from the UE, reporting of measurements for at least some of the set of cells in accordance with the measurement configuration; and
transmitting, to the UE, PHY layer or MAC layer mobility signaling to move the UE to one of the cells in the set, wherein:
the mobility signaling is based, at least in part, on the reported measurements;
the mobility signaling comprises a mobility command to at least one of:
activate one or more cells not currently in a subset of cells, of the set of cells, activated for serving the UE; or
de-activate one or more cells in a subset of cells, of the set of cells, activated for serving the UE; and
the activation or the de-activation of the one or more cells indicated by the mobility signaling is based on a capability of the UE to support multiple cells.

30. A method for wireless communications by a user equipment (UE), comprising:
receiving signaling configuring the UE with a set of cells that support physical (PHY) layer or medium access control (MAC) layer mobility signaling and with a measurement configuration for the set of cells;
reporting, to a network entity, measurements for at least some cells in the set of cells in accordance with the measurement configuration;
receiving, from the network entity, PHY layer or MAC layer mobility signaling to move the UE to one of the cells in the set of cells, wherein:
the mobility signaling comprises a mobility command to at least one of:
activate one or more cells not currently in a subset of cells, of the set of cells, activated for serving the UE; or
de-activate one or more cells in a subset of cells, of the set of cells, activated for serving the UE; and
the activation or the de-activation of the one or more cells indicated by the mobility signaling is based on a capability of the UE to support multiple cells.

* * * * *